US011395289B2

United States Patent
Yoo et al.

(10) Patent No.: US 11,395,289 B2
(45) Date of Patent: *Jul. 19, 2022

(54) METHOD AND APPARATUS FOR DECODING RANDOM ACCESS RESPONSE MESSAGE IN WIRELESS COMMUNICATION SYSTEM

(71) Applicant: Samsung Electronics Co., Ltd., Suwon-si (KR)

(72) Inventors: Hyunil Yoo, Suwon-si (KR); Taeyoung Kim, Seoul (KR); Jeehwan Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

This patent is subject to a terminal disclaimer.

(21) Appl. No.: 16/915,138

(22) Filed: Jun. 29, 2020

(65) Prior Publication Data

US 2020/0329466 A1 Oct. 15, 2020

Related U.S. Application Data

(63) Continuation of application No. 16/090,523, filed as application No. PCT/KR2017/003696 on Apr. 4, 2017, now Pat. No. 10,701,684.

(30) Foreign Application Priority Data

Feb. 3, 2017 (KR) .................. 10-2017-0015793

(51) Int. Cl.
*H04W 72/04* (2009.01)
*H04L 1/16* (2006.01)
(Continued)

(52) U.S. Cl.
CPC ............. *H04W 72/044* (2013.01); *H04L 1/08* (2013.01); *H04L 1/1614* (2013.01); *H04L 1/18* (2013.01);
(Continued)

(58) Field of Classification Search
CPC ............. H04W 72/044; H04W 74/085; H04W 74/008; H04W 74/0833; H04W 72/042;
(Continued)

(56) References Cited

U.S. PATENT DOCUMENTS 9,729,219 B2 8/2017 Chapman et al.
9,800,304 B2 10/2017 Kim et al.
(Continued)

FOREIGN PATENT DOCUMENTS

KR 10-2015-0024333 A 3/2015
KR 10-1563469 B1 10/2015
(Continued)

OTHER PUBLICATIONS

European Office Action dated Jun. 10, 2020, issued in European Application No. 17779317.1-1205.
(Continued)

*Primary Examiner* — Dady Chery
(74) *Attorney, Agent, or Firm* — Jefferson IP Law, LLP

(57) ABSTRACT

The present disclosure relates to a communication technique for converging an IoT technology with a 5G communication system for supporting a higher data transmission rate beyond a 4G system, and a system therefor. The present disclosure may be applied to an intelligent service (for example, a smart home, a smart building, a smart city, a smart car or connected car, healthcare, digital education, retail business, a security and security related service, or the like) on the basis of a 5G communication technology and an IoT related technology. A method for a terminal according to the present
(Continued)

disclosure comprises the steps of transmitting a random access preamble through a resource associated with a resource through which a downlink synchronization signal has been received; receiving a random access response message to the random access preamble; and decoding the random access response message by using information determined on the basis of the resource through which the downlink synchronization signal has been received.

16 Claims, 18 Drawing Sheets

Related U.S. Application Data

(60) Provisional application No. 62/317,943, filed on Apr. 4, 2016.

(51) Int. Cl.
| | | |
|---|---|---|
| *H04L 1/18* | (2006.01) | |
| *H04L 5/00* | (2006.01) | |
| *H04W 74/08* | (2009.01) | |
| *H04L 1/08* | (2006.01) | |
| *H04W 74/00* | (2009.01) | |
| *H04L 5/14* | (2006.01) | |
| *H04B 7/06* | (2006.01) | |

(52) U.S. Cl.
CPC .......... *H04L 1/1854* (2013.01); *H04L 1/1861* (2013.01); *H04L 5/0048* (2013.01); *H04L 5/0053* (2013.01); *H04L 5/14* (2013.01); *H04W 72/042* (2013.01); *H04W 72/0413* (2013.01); *H04W 74/008* (2013.01); *H04W 74/085* (2013.01); *H04W 74/0833* (2013.01); *H04B 7/0617* (2013.01)

(58) Field of Classification Search
CPC .... H04W 72/0413; H04L 1/08; H04L 5/0048; H04L 1/18; H04L 5/0053; H04L 1/1861; H04L 1/1854; H04L 1/1614; H04L 5/14; H04B 7/0617
See application file for complete search history.

(56) References Cited

U.S. PATENT DOCUMENTS

| | | | |
|---|---|---|---|
| 10,305,637 | B2 | 5/2019 | Kim et al. |
| 2011/0228863 | A1 | 9/2011 | Papasakellariou et al. |
| 2012/0163326 | A1 | 6/2012 | Lee et al. |
| 2012/0213163 | A1 | 8/2012 | Lee et al. |
| 2012/0230272 | A1 | 9/2012 | Kim et al. |
| 2013/0072243 | A1 | 3/2013 | Yu et al. |
| 2013/0121185 | A1 | 5/2013 | Li et al. |
| 2013/0172002 | A1 | 7/2013 | Yu et al. |
| 2013/0301586 | A1 | 11/2013 | Fan et al. |
| 2014/0126520 | A1* | 5/2014 | Quan ................ H04W 74/0866 370/329 |
| 2014/0177607 | A1 | 6/2014 | Li et al. |
| 2014/0204883 | A1 | 7/2014 | Lee et al. |
| 2014/0254515 | A1 | 9/2014 | Kim et al. |
| 2015/0063179 | A1 | 3/2015 | Yang et al. |
| 2015/0117380 | A1 | 4/2015 | Zhang et al. |
| 2015/0139136 | A1 | 5/2015 | Zhang et al. |
| 2015/0208443 | A1 | 7/2015 | Jung et al. |
| 2015/0237619 | A1 | 8/2015 | Yang et al. |
| 2015/0341878 | A1 | 11/2015 | Lee et al. |
| 2016/0100382 | A1 | 4/2016 | He et al. |
| 2016/0156454 | A1 | 6/2016 | Khoryaev et al. |
| 2016/0157267 | A1 | 6/2016 | Frenne et al. |
| 2016/0337916 | A1 | 11/2016 | Deenoo et al. |
| 2017/0214444 | A1 | 7/2017 | Nigam et al. |

FOREIGN PATENT DOCUMENTS

| | | |
|---|---|---|
| KR | 10-2016-0015821 A | 2/2016 |
| WO | 2014/027868 A1 | 2/2014 |
| WO | 2015/109153 A1 | 7/2015 |
| WO | 2015/147717 A1 | 10/2015 |

OTHER PUBLICATIONS

U.S. Non-Final Office Action dated Dec. 2, 2019, issued in U.S. Appl. No. 16/422,164.
Huawei Technologies Co. et al., "pCR TR45.820 NB M2M—Data Transmission and Retransmission", 3GPP Draft; GPC150152 PCR 45.820, vol. TSG GERAN, No. Sophia-Antipolis, France; XP050945259, Apr. 20, 2015.
European Search Report dated Feb. 5, 2019, issued in European Patent Application No. 17779333.8.
European Search Report dated Feb. 15, 2019, issued in European Patent Application No. 17779317.1.
3GPP; "Further details on uplink transmissions for NB-IoT"; LG Electronics; Feb. 15-19, 2016; pp. 1-4; 3GPP TSG RAN1 #84; St. Julian's, Malta; R1-160621.
3GPP; "UCI transmission for NB-IoT"; ZTE; Mar. 22-24, 2016; pp. 1-5; 3GPP TSG RAN WG1 NB-IoT Ad-Hoc Meeting; Sophia-Antipoils, France; R1-161871.
3GPP; "UCI for NB-IoT"; Huawei, HiSilicon; Mar. 22-24, 2016; pp. 1-6; 3GPP TSG RAN WG1 NB-IoT Ad-Hoc Meeting #2; Sophia-Antipoils, France; R1-161808.
Korean Office Action dated Mar. 5, 2021, issued in Korean Application No. 10-2017-0043613.
3GPP TS 36.523-1 V13.0.0 (Mar. 2016), Release 13.
"3rd Generation Partnership Project; Technical Specification Group Radio Access Network; Evolved Universal Terrestrial Radio Access (E-UTRA); Medium Access Control (MAC) protocol specification (Release 12)", 3GPP Standard; 3GPP TS 36.321, 3rd Generation Partnership Project (3GPP), Mobile Competence Centre ; 650, Route Des Lucioles ; F-06921 Sophia-Antipolis Cedex ; France, vol. RAN WG2, No. VI2.7.0, Sep. 24, 2015 (Sep. 24, 2015), pp. 1-77, XP050996302.
European Office Action dated Nov. 13, 2020, issued in European Application No. 17779333.8.
U.S. Notice of Allowance dated Nov. 13, 2020, issued in U.S. Appl. No. 16/677,006.

\* cited by examiner

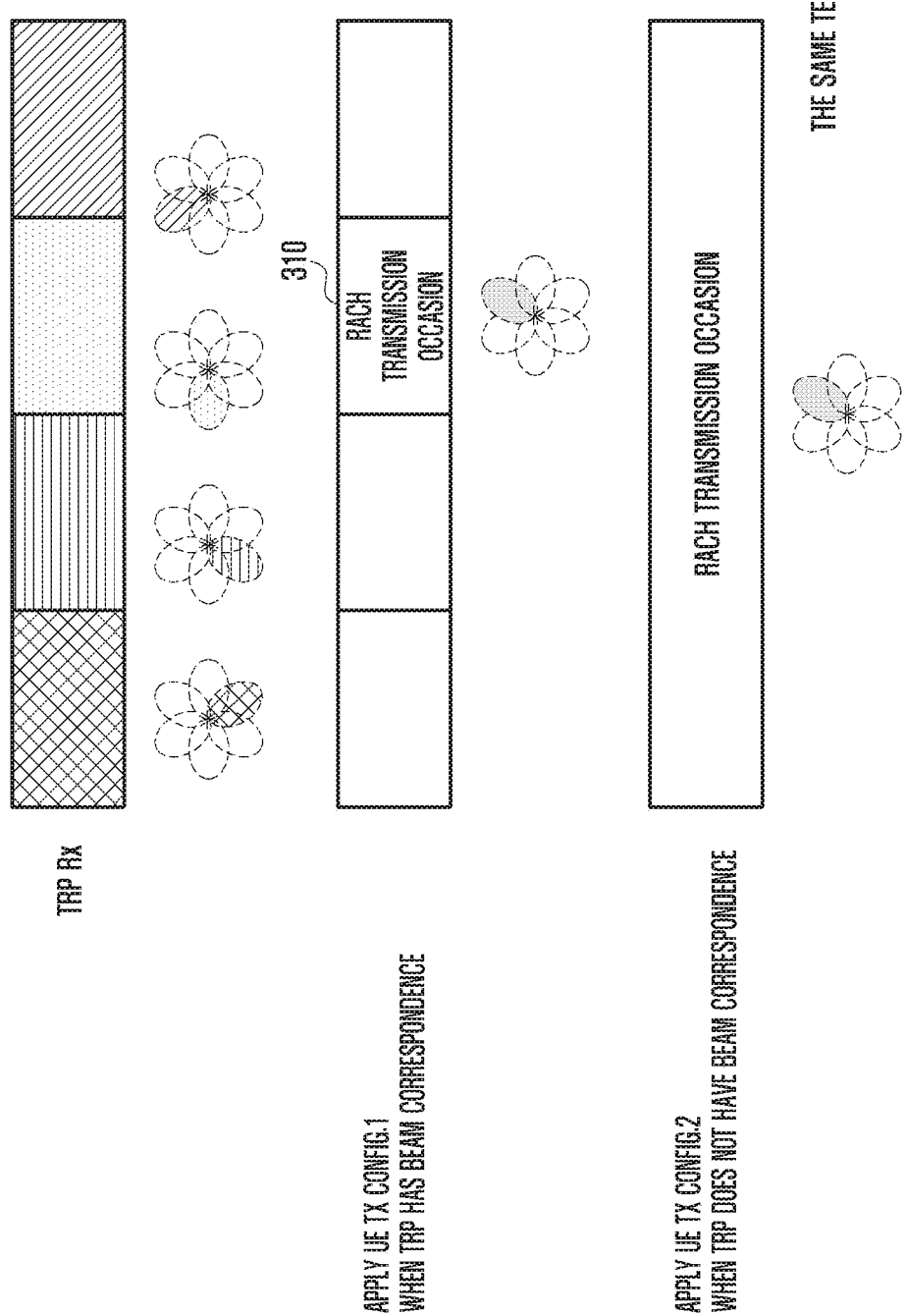

METHOD AND APPARATUS FOR DECODING RANDOM ACCESS RESPONSE MESSAGE IN WIRELESS COMMUNICATION SYSTEM

CROSS-REFERENCE TO RELATED APPLICATION(S)

This application is a continuation application of prior application Ser. No. 16/090,523, filed on Oct. 1, 2018, which has issued as U.S. Pat. No. 10,701,684 on Jun. 30, 2020, which is a U.S. National Stage application under 35 U.S.C. § 371 of an International application number PCT/KR2017/003696, filed on Apr. 4, 2017, which claimed the benefit of US Provisional Application No. 62/317,943 filed on Apr. 4, 2016, and was based on and claimed priority under 35 U.S.C § 119(a) of a Korean patent application number 10-2017-0015793, filed on Feb. 3, 2017, in the Korean Intellectual Property Office, the disclosure of which is incorporated by reference herein in its entirety.

TECHNICAL FIELD

Various embodiments of the present disclosure relate to a method for decoding a random access response message in a wireless communication system, and more particularly, to a method for decoding a random access response message using a relationship between a random access preamble message and a random access response message during a random access procedure.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

On the other hand, when different terminals transmit the same random access preamble, the base station cannot identify between different terminals. Therefore, the base station transmits one random access response, and the terminal receives the same random access response. The random access response may include uplink resource allocation information, and the terminal may transmit a radio resource control (RRC) connection request message through the same uplink resource. The message may act as interference from the viewpoint of the base station. Therefore, there is a need for a method for setting a relationship between a random access preamble and a random access response message and transmitting different random access responses to different terminals even when the terminal transmits the same random access preamble.

DISCLOSURE OF INVENTION

Technical Problem

An object of the present disclosure is directed to provision of a method for setting a relationship between a random access preamble and a random access response message in a random access procedure and transmitting different random access responses to different terminals even when a terminal transmits the same random access preamble.

Solution to Problem

Various embodiments of the present disclosure are directed to the provision of a method of a terminal in a wireless communication system, including: transmitting a random access preamble through a resource associated with a resource receiving a downlink synchronization signal; receiving a random access response message for the random access preamble; and decoding the random access response message using information determined based on the resource receiving the downlink synchronization signal.

Various embodiments of the present disclosure are directed to the provision of a method of a base station in a wireless communication system, including: receiving a random access preamble through a resource associated with a resource transmitting a downlink synchronization signal; and transmitting a random access response message based on the resource transmitting the downlink synchronization signal, wherein the random access response message is decoded using information determined based on a resource receiving the downlink synchronization signal.

Various embodiments of the present disclosure are directed to the provision of a terminal in a wireless communication system, including: a transceiver configured to transmit and receive a signal; and a controller configured to transmit a random access preamble through a resource associated with a resource receiving a downlink synchronization signal; receive a random access response message to the random access preamble; and decode the random access response message by using information determined based on the resource receiving the downlink synchronization signal.

Various embodiments of the present disclosure are directed to the provision of a base station in a wireless communication system, including: a transceiver configured to transmit and receive a signal; and a controller configured to receive a random access preamble through a resource associated with a resource transmitting a downlink synchronization signal, and transmit a random access response message based on a resource transmitting the downlink synchronization signal, wherein the random access response message is decoded using information determined based on a resource receiving the downlink synchronization signal.

Advantageous Effects of Invention

According to the present disclosure, it is possible for each terminal to receive different random access response messages even if different terminals transmit the same random access preamble by setting the relationship between the random access preamble and the random access response message.

BRIEF DESCRIPTION OF DRAWINGS

FIG. 3A is a diagram illustrating a method for transmitting a first message according to beam reciprocity in the beamforming based system according to the present disclosure.

MODE FOR THE INVENTION

Figure 1:
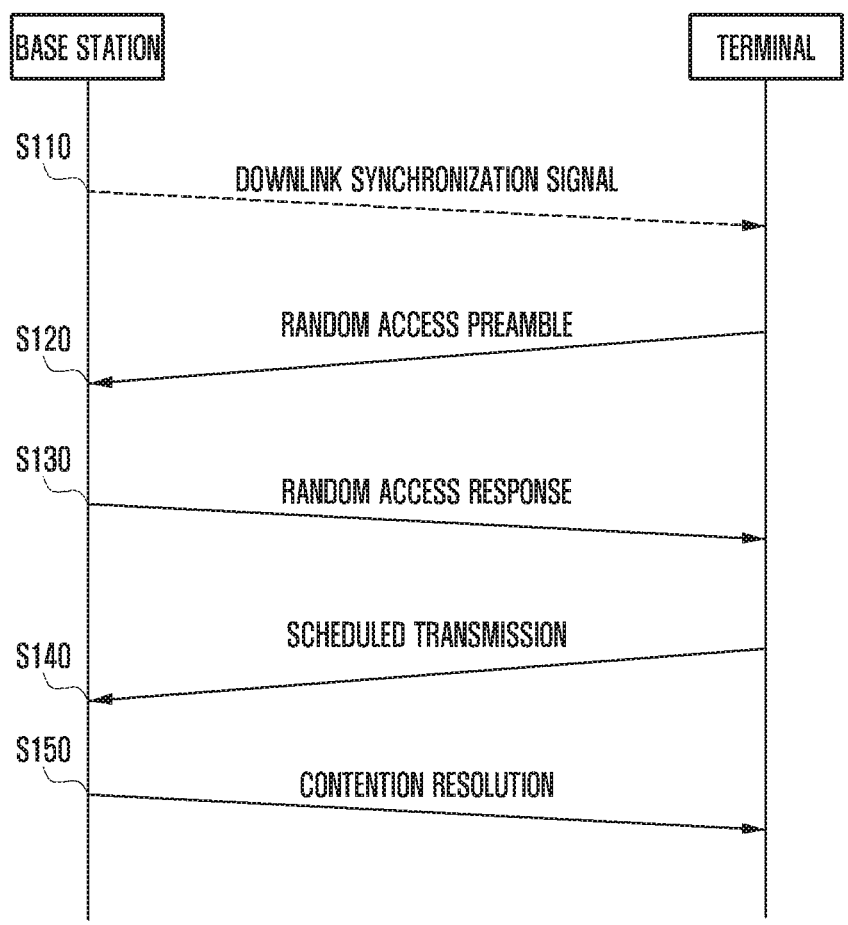
FIG. 1 is a diagram illustrating a random access procedure in LTE.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are contiguously illustrated may be substantially simultaneously performed in fact or be performed in a reverse sequence depending on corresponding functions sometimes.

Here, the term '-unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processors. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

Further, in the drawings illustrating a method in embodiments, the order of description does not necessarily correspond to the order of execution, and the order relationship may be changed or executed in parallel.

In addition, the present disclosure describes, by way of example, a case of a wireless communication system for convenience of explanation, but the content of the present disclosure may also be applied to a wired communication system.

FIG. 1 is a diagram illustrating a random access procedure in LTE.

A base station cannot know which terminal is connected at the time of an initial access. Therefore, a terminal attempting to access a network through power-on or handover may first acquire downlink synchronization through a downlink synchronization signal (SS).

Referring to FIG. 1, in step S110, the terminal may receive the downlink synchronization signal. The terminal may perform synchronization using the downlink synchronization signal.

In step S120, the terminal may transmit a random access preamble to the base station. In the present disclosure, a message which transmits the random access preamble may be referred to as a first message or MSG1.

Specifically, the terminal may acquire random access channel configuration (RACH configuration) information transmitted through a downlink broadcast signal (broadcast channel (BCH)/system information block (SIB) or the like), and select any random access (RA) sequence based on the acquired RACH configuration information and transmit the selected random access sequence to the base station (MSG1).

In step S130, the base station receiving the random access preamble may transmit a random access response (RAR) message (hereinafter, referred to as a second message or MSG2) to the terminal.

Specifically, the base station may detect the RACH from each terminal and transmit a random access response message including resource allocation information for uplink transmission to the terminal (MSG2).

The resource to which the random access response is transmitted may be indicated by DCI transmitted on PDCCH, and the DCI may be scrambled using RA-RNTI (may be addressed to the RA-RNTI on the PDCCH). Also, the random access response message may include at least one of information on a physical ID generated based on a preamble identifier, information related to time alignment, initial uplink grant information (uplink resource allocation information), and temporary C-RNTI.

The terminal may transmit the random access preamble (or a PRACH preamble), and determine that the transmission fails when not receiving a response from the base station for a predetermined time and retransmit the random access preamble.

On the other hand, in step S140, the terminal receiving the random access response message from the base station may transmit an RRC connection request message (may be referred to as a third message or MSG3) to the base station.

The terminal may transmit a third message using an uplink resource which is configured from the base station, and the terminal may transmit a message for its own unique ID and RRC connection to the third message.

In step S150, the base station detecting the message may transmit RRC setup information to the terminal. This may allow the base station to perform contention resolution. In this case, early contention resolution addressed to temporary C-RNTI for initial access can be made. However, in a non-contention based random access procedure such as handover, only the steps S120 and S130 in the above procedure may be performed.

Meanwhile, the case in which a collision occurs during the random access procedure is as follows.

In the procedure of transmitting the first message MSG1, two different terminals may select the same RA sequence (or the RACH sequence) and transmit the selected RA sequence to the base station. The base station may detect the RACH sequences transmitted from different terminals, but the base station cannot identify between different terminals because the RA sequences transmitted by the terminal are the same.

Therefore, the base station transmits only one second message (MSG2) corresponding to the RA sequence, so that the two different terminals all receive the same MSG2.

Therefore, the two different terminals transmit the third message MSG3 using the same uplink resource allocated through the same MSG2. When the base station receives MSG3 from different terminals, the two MSG3 may interfere with each other.

Accordingly, the present disclosure proposes a method for establishing a relationship between MSG1 and MSG2 to reduce collision probability in a beamforming based random access procedure so that a base station transmits different MSG2 to different terminals even when the terminals transmit the same MSG1.

Figure 2:
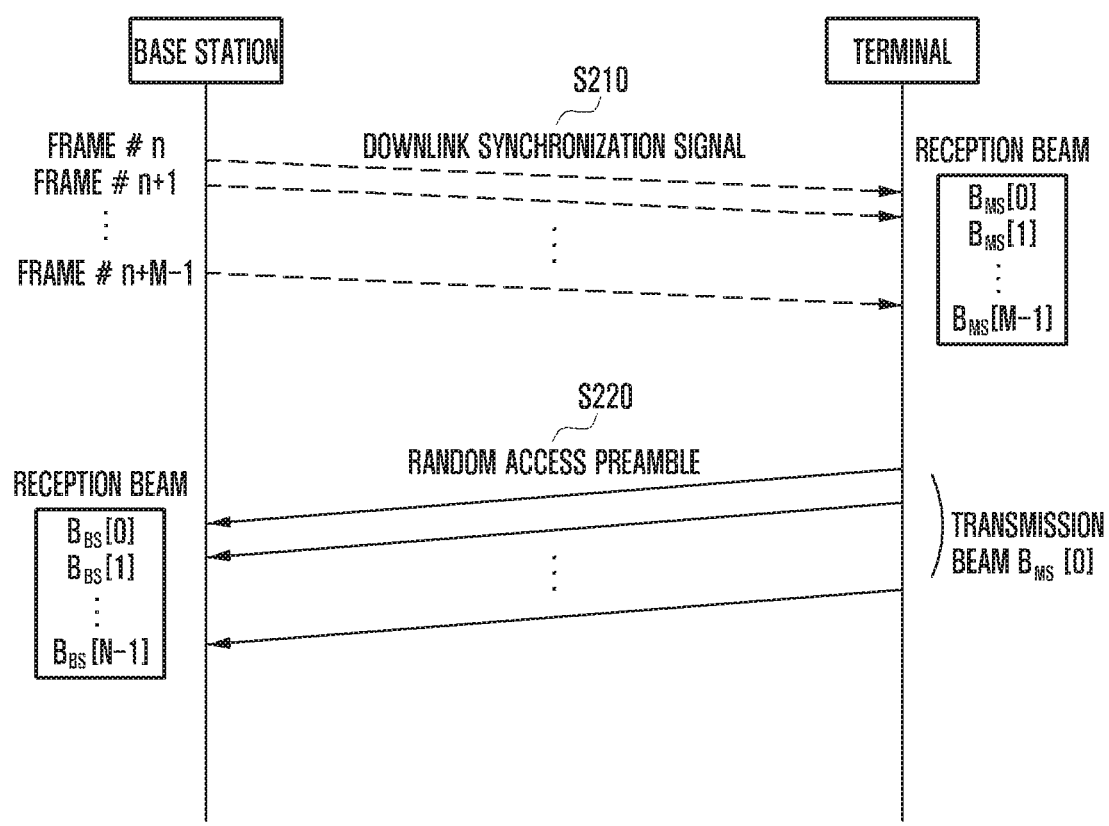
FIG. 2 is a diagram illustrating a random access procedure in a beamforming-based system according to the present disclosure.

FIG. 2 is a diagram illustrating a random access procedure in a beamforming-based system according to the present disclosure.

The embodiment shown in FIG. 2 shows the random access procedure on the assumption that there is no beam reciprocity. The beam reciprocity means that the base station or the terminal may use a reception beam as a transmission beam or use the transmission beam as the reception beam. That is, the situation in which there is no beam reciprocity may represent that a beam used for downlink reception may not be used as a transmission beam for uplink transmission or a beam used for uplink reception may not be used as a transmission beam for downlink transmission.

Referring to FIG. 2, the base station may transmit the downlink synchronization signal every frame in step S210. At this time, the base station may transmit the downlink synchronization signal while altering the transmission beam in the frame. The terminal may detect the downlink synchronization signal while altering the reception beam every frame.

The terminal that detects the downlink synchronization signal selects the RA sequence for random access.

In step S220, the terminal may transmit the random access preamble message (first message). At this time, the terminal may repeatedly transmit the first message so that the base station can receive the first message using all of the reception beams.

FIG. 3A is a diagram illustrating a method for transmitting a first message according to beam reciprocity in the beamforming based system according to the present disclosure.

As described above, the situation where there is no beam reciprocity means the state in which the beam used for the downlink reception may not be used as the transmission beam for the uplink transmission, or the beam used for the uplink reception may not be used as the transmission beam for the downlink transmission, and the beam reciprocity may be used in combination with the term 'beam correspondence'.

The terminal may receive the downlink synchronization signal of the base station and measure the received downlink synchronization signal to determine the transmission beam of the base station having the strongest signal strength. At this time, if the beam correspondence exists, the terminal may assume that the transmission beam is used as the reception beam, thereby selecting an RACH resource 310 corresponding to the reception beam of the base station (UE Tx config. 1). Accordingly, the terminal may transmit the first message on the selected RACH resource 310.

On the other hand, when the beam correspondence does not exist, the terminal may transmit the first message to all the reception beams of the base station (UE Tx config. 2). At this time, the terminal may repeatedly transmit the first message using a fixed beam, and the beam of the terminal may be determined according to whether the terminal has the beam correspondence.

For example, when the terminal has the beam correspondence, the terminal may transmit the first message using the beam that receives the downlink synchronization signal. On the other hand, when the terminal does not have the beam correspondence, the terminal may transmit the first message using any beam. However, the embodiment of the present disclosure is not limited thereto, and may use a method that allows a terminal to transmit a first message by selecting any beam regardless of beam correspondence of the terminal, and alters and transmits a beam when the terminal fails to receive a second message.

An occasion in which the terminal transmits the first message may be referred to as a RACH transmission occasion, and the RACH transmission occasion may include one symbol or a plurality of symbols.

That is, according to the present disclosure, one RACH preamble format can be transmitted in the RACH transmission occasion, in which the RACH preamble format may transmit single or multiple RACH preambles. One preamble is composed of one or a plurality of RACH sequences, and the RACH sequence is composed of one or a plurality of RACH symbols.

Figure 3B:
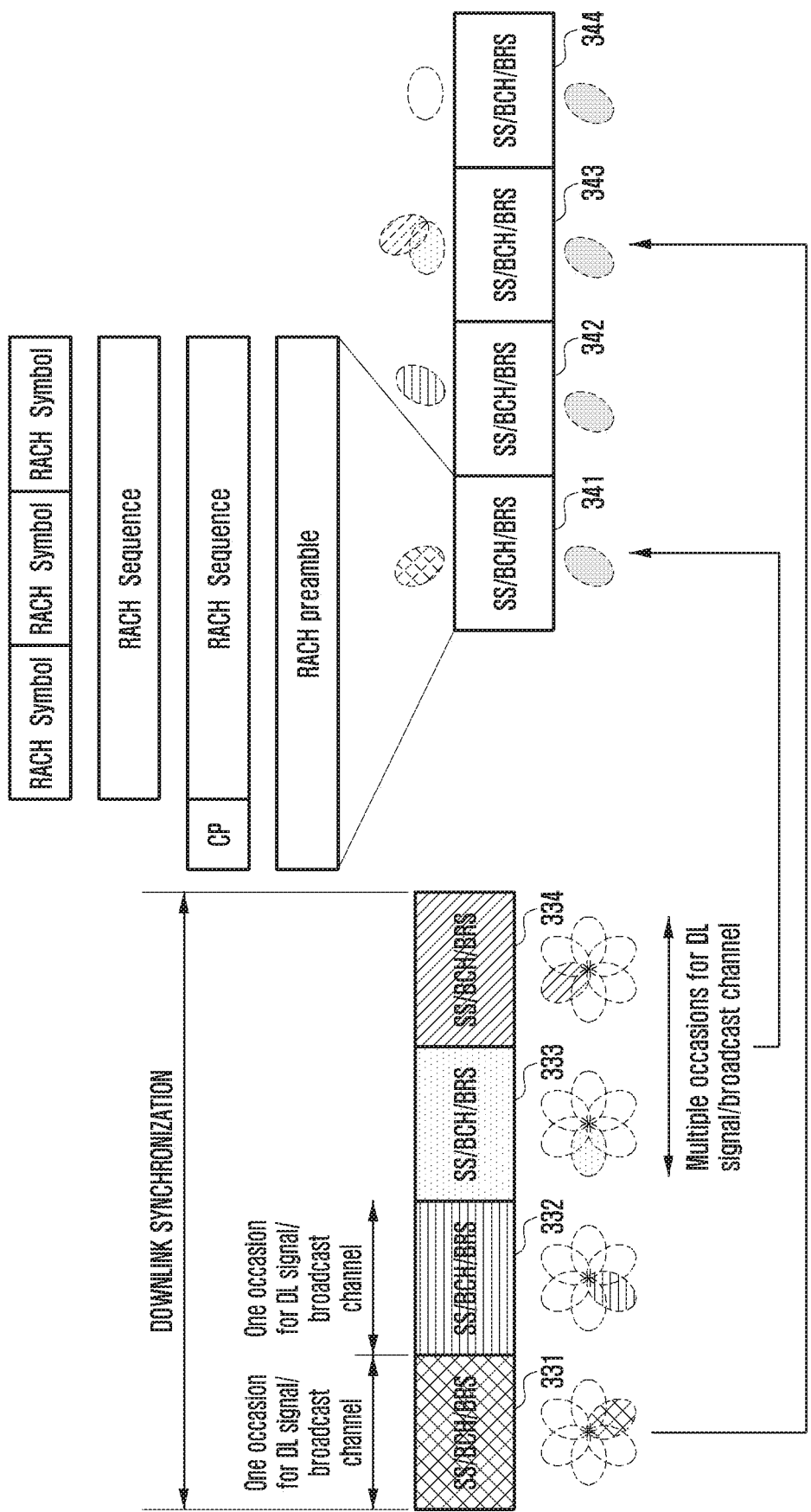
FIG. 3B is a diagram illustrating in detail a process of transmitting a first message shown in FIG. 2.

FIG. 3B is a diagram illustrating in detail a process of transmitting a first message shown in FIG. 2.

As shown in FIG. 3B, a resource capable of transmitting a RACH preamble format is associated with a downlink signal or channel (DL signal/channel). At this time, as can be seen in FIG. 3B, one downlink signal or channel may be associated with one RACH resource, and a plurality of downlink signals or channels may be associated with one RACH resource. Also, although not shown in the figure, one downlink signal or channel may be associated with a plurality of RACH resources.

At this time, the downlink signal or channel may mean a synchronization signal, a reference signal, or a broadcast channel. Accordingly, the fact that the downlink signal or channel can be associated with the RACH resource means that the downlink signal is received or the resource on which the channel is located can be associated with the RACH resource.

Referring to FIG. 3B, a downlink signal or channel 1 331 may be associated with a subset 341 of RACH resource, and a downlink signal or channel 2 332 may be associated with a subset 342 of RACH resource. This shows an example in which one occasion for DL signal/broadcast channel for a downlink signal or channel is associated with a subset of one RACH resource.

In addition, downlink signal or channels 3 and 4 333 and 334 may be associated with a subset 343 of RACH resources. This shows an example in which multiple occasions for DL signal/broadcast channel for the downlink signal or channel is associated with a subset of one RACH resource.

Accordingly, the terminal may select a subset of RACH resources using the downlink measurement and the corresponding relationship.

At this time, the subset of RACH resources may be composed of one or a plurality of RACH resources. The present disclosure is described on the assumption that the subset of RACH resources is composed of one RACH resource. In such a case, the subset of RACH resources may be used as the same concept as the RACH resource. However, the embodiment of the present disclosure is not limited thereto, and the present disclosure may similarly be applied to the case in which the subset of RACH resources is composed of a plurality of RACH resources.

If there is no beam reciprocity, when a specific DL signal/channel is detected, the terminal may select the corresponding RACH resource and transmit the RACH preamble format.

At this time, the terminal may transmit single or multiple/repeated preamble(s) during the RACH transmission occasion using the same transmission beam (during a RACH transmission occasion of single or multiple/repeated preamble(s), UE uses the same UE Tx beam).

On the other hand, if there is the beam reciprocity, when the terminal detects the downlink signal or channel 2 332, the terminal may transmit the RACH preamble format in the RACH resource 342 which corresponds to the downlink signal, the broadcast information (BCH) decoded after the detection of the downlink signal or the channel 2 332.

On the other hand, the RACH preamble format is composed of single or multiple RACH preamble(s), and the RACH preamble is composed of single or a plurality of RACH sequences and CPs. The RACH sequence is composed of one or a plurality of RACH OFDM symbols.

The RACH OFDM symbol may have one or a plurality of subcarrier spacing values. That is, in the case of operating in a low frequency band, an RACH OFDM symbol (RACH symbol) having a short subcarrier spacing with respect to a data channel as in the LTE may be considered, and in the case of operating in a high frequency band, an RACH OFDM symbol having a subcarrier spacing similar to a data channel in consideration of phase noise may be considered. In the case of considering an RACH OFDM symbol having a short length, the repeated transmission can be made for coverage extension.

Figure 4:
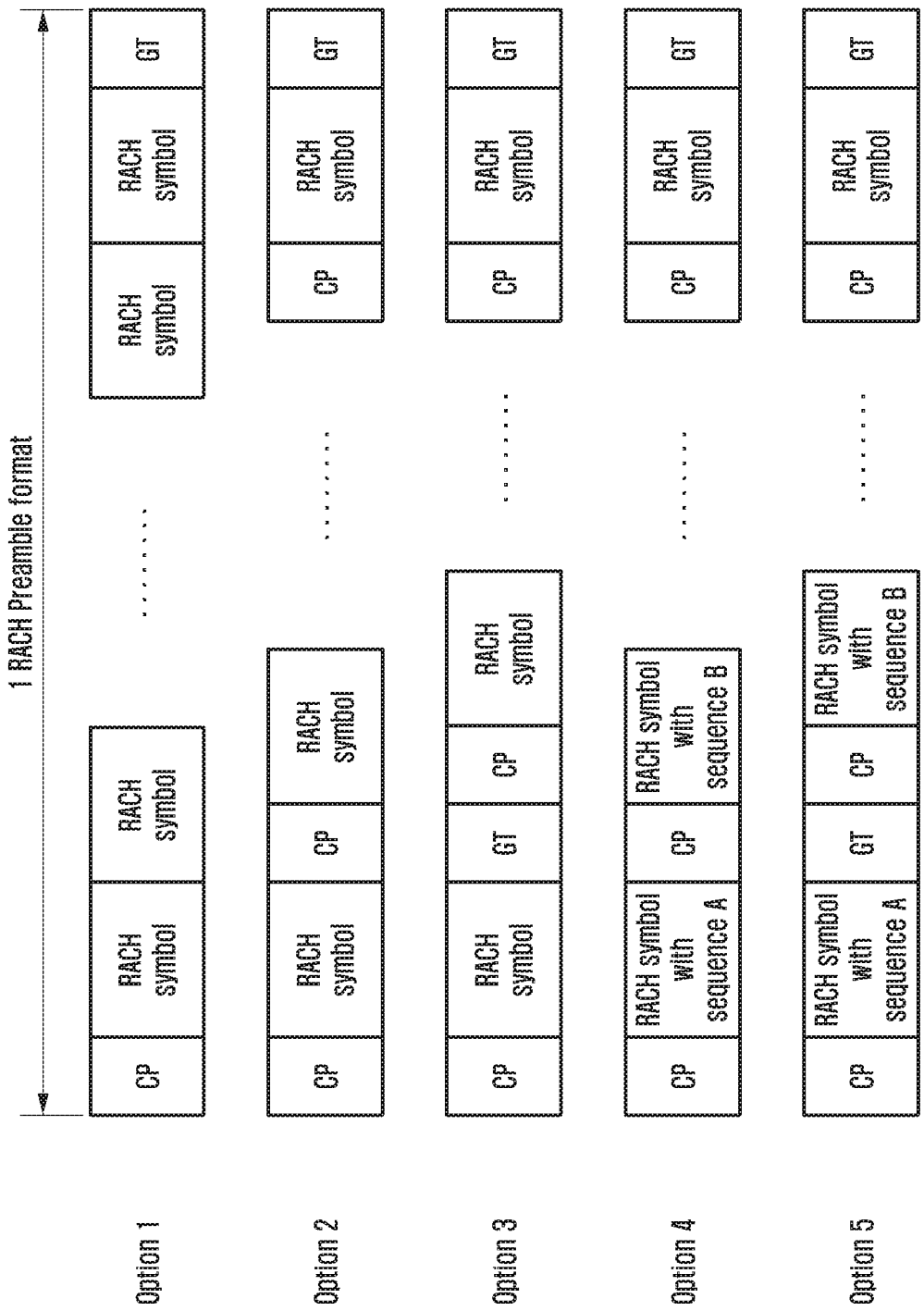
FIG. 4 is a diagram illustrating various RACH preamble formats according to the present disclosure.

To this end, the RACH preamble format may be classified as shown in FIG. 4. Here, unlike the format shown in FIG. 4, a general RACH preamble format may be represented as follows.

TABLE 1

| Preamble format | $T_{CP}$ | $T_{GP}$ | $T_{SEQ}$ | Note |
|---|---|---|---|---|
| 1 | $M \cdot T_S$ | $G \cdot T_s$ | $N \cdot T_s$ | $T_1$: $1/(\Delta f \times N_{FFT})$, $\Delta f$: subcarrier spacing, $N_{FFT}$: FFT size |
| | | | | M should be longer than round-trip delay |
| | | | | N is length for RACH sequence |
| | | | | G is the length of guard interval |

Here, Ts represents one sample duration in a time domain. M represents a length of a cyclic prefix CP, G represents a length of a guard interval GT, and N is the number of samples of an RACH preamble length. In this case, the G may mean the number of time domain samples corresponding to GT/Ts.

FIG. 4 is a diagram illustrating various RACH preamble formats according to the present disclosure.

FIG. 4 shows an example for various RACH preamble formats 2.

Referring to FIG. 4, in option 1 (Format 2-1), the preamble format may be configured so that the CP and the GT are inserted and the RACH preamble is repeatedly transmitted.

Also, in option 2 (Format 2-2), the preamble format may be configured so that the CP and the RACH sequence are repeatedly transmitted in pairs, and the GT is inserted at the end.

Also, in option 3 (Format 2-3), the preamble format may be configured so that the CP, the RACH sequence, and the GT are repeatedly transmitted in pairs.

Also, in option 4 (Format 2-4), the preamble format may be configured to configure and repeatedly transmit the RACH preamble with different RACH sequences in the option 2 (Format 2-2).

Also, in option 5 (Format 2-5), the preamble format may be configured to configure and repeatedly transmit the RACH preamble with different RACH sequences in the option 3.

The RACH preamble format 2 may be configured as at least one of the above-described formats 2-1 to 2-5. Alternatively, at least one of the above-described formats 2-1 to 2-5 may be used in a separate format, respectively.

On the other hand, the preamble format shown in the Format 2-1 can be represented as shown in Table 2 below. In Table 2, k is a parameter indicating the repeated transmission, and may be transmitted to the terminal through the SIB/MIB or a higher layer signal.

TABLE 2

Preamble format 2-1

| Preamble format | $T_{CP}$ | $T_{GP}$ | $T_{SEQ}$ | Note |
|---|---|---|---|---|
| 2-1 | $M \cdot T_S$ | $G \cdot T_s$ | $K \cdot N \cdot T_s$ | A UE transmits consecutive 'K' RACH symbols during RACH occasion. The value of K should be indicated to UE via higher, layer signalling |

The option shown in Format 2-1 is advantageous in that data channel decoding and RACH may be detected using only one FFT when the data channel and the RACH are multiplexed.

Figure 5:
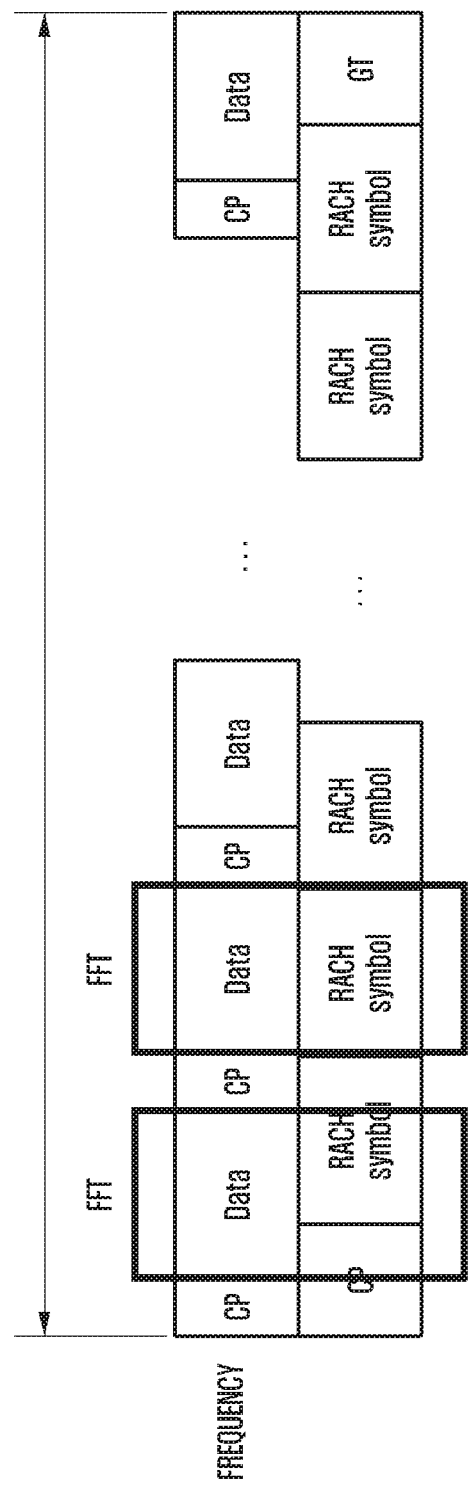
FIG. 5 is a diagram showing an embodiment in which only one FFT is used when the RACH and a data channel are multiplexed.

FIG. 5 is a diagram showing an embodiment in which only one FFT is used when the RACH and a data channel are multiplexed.

As shown in FIG. 5, an FFT window is adjusted to detect the data channel. In this case, since the preamble format is repeated without the CP, orthogonality between preamble OFDM symbols is not broken. Accordingly, using the FFT window to decode the data channel, the RACH symbol can be detected with only phase rotation being generated. However, when only one FFT is used, there is a disadvantage that a guard interval is included between the beam and the beam.

Figure 6:
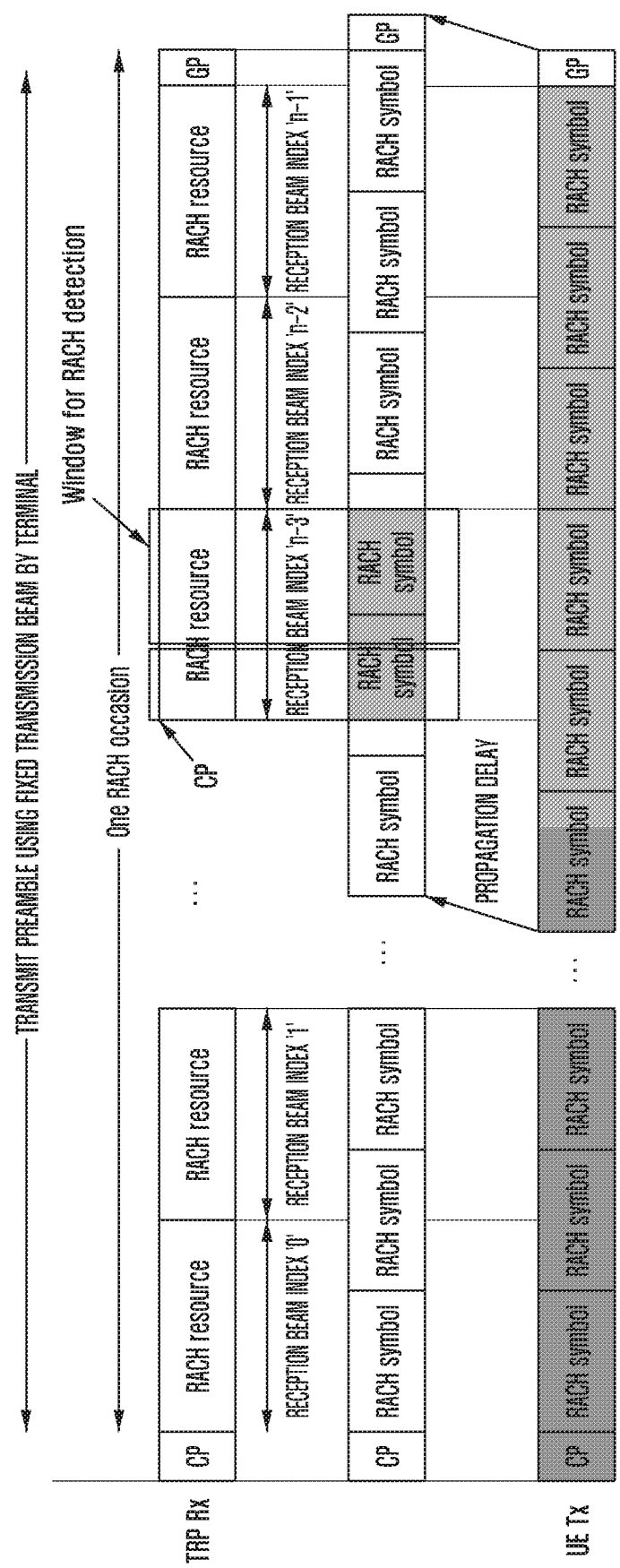
FIG. 6 is a diagram illustrating a case where FFT having different sizes are used while using preamble format 2-1.

FIG. 6 is a diagram illustrating a case where FFT having different sizes are used while using preamble format 2-1.

As in the embodiment shown in FIG. 5, when FFT for decoding a data channel is performed, data may be decoded without inter-channel interference due to RACH OFDM symbols having the repeated characteristics of the preamble format 2-1. However, when the same FFT is applied to detect the RACH, the orthogonality of the data channel is broken and the inter-channel interference occurs. Therefore, when the RACH is detected, a band in which the RACH is transmitted is first filtered in the same manner as LTE, and the FFT is performed on the corresponding RACH. In the case of detecting the RACH in this manner, there is an advantage that the guard time between the beams is not needed since there is no need to match the beam to the data channel as shown in FIG. 5.

On the other hand, the classified preamble formats 2-2 and 2-3 are different from preamble format 2-1 in that the CP between the RACH preambles is inserted. Therefore, an orthogonal cover code (OCC) may be applied over various RACH OFDM symbols or RACH sequences as a method for increasing capacity.

For example, assuming that two RACH sequences are repeated, the RA capacity may be increased using OCCs of [1 1] and [1 −1] while using the same RA sequence.

When the preamble format 2-1 is used, the capacity may be increased by the cyclic prefix in a frequency domain. For example, assuming that a length of RACH sequence for the preamble format 2-1 is N and the sequence mapped in the frequency domain is x, that is, when RACH sequences of x[0], ... ,x[N−1] are considered, a first terminal may use RA sequence of x[0], x[1], ... ,x[N−2], x[N−1] and a second terminal may use an extended RA sequence using cyclic prefixes of x[1], x[2], ... ,x[N−1], x[0].

On the other hand, the subset of the RACH resource may be composed of one or a plurality of RACH resources.

In the subset of one RACH resource, the transmission and reception beams of the terminal and the base station may be fixed. Also, as described above, the subset of one RACH resource may be associated with one or a plurality of DL signals/channel occasions.

In addition, as described above, when the base station does not have beam reciprocity, the terminal transmits the RACH preamble over a subset of all RACH resources so that the base station may detect the RACH while altering the receive beam, and when the base station has beam reciprocity, one or multiple RACH preambles may be transmitted by selecting the subset of RACH resources corresponding to the DL signal/channel estimated on the downlink.

The terminal may transmit a plurality of RACHs during one RACH transmission occasion, as in the case where there is no beam reciprocity. In this case, the base station may receive the plurality of RACHs while altering the beam of the base station. At this time, even if the detected RACHs all have the same RACH preamble ID (preamble ID), the base station may not assume that the detected RACH preamble ID is transmitted from one terminal. That is, the base station may not identify whether the plurality of detected RACHs are RACHs transmitted from one terminal or RACHs transmitted from a plurality of terminals. Here, the base station may consider the following method for transmitting a random access response.

1-1. The base station may transmit one RAR on the assumption that it has received a plurality of received RACHs from one terminal. The RAR may include grant information, and the grant information may include uplink resource allocation information for transmitting MSG3. Also, the RAR may include timing information for uplink synchronization. When transmitting a single RAR, the base station should determine which timing information should be included.

1-1-1. The base station may include the timing information in the RAR based on the RACH signal having the largest signal.

1-1-2. The base station may include the timing information in the RAR based on the RACH signal having the largest propagation delay. Based on the timing at which the propagation delay is largest, it means that the terminal may transmit the uplink signal at the earliest time, and the MSG3 transmission does not collide with the downlink transmission signal of the base station. However, the earlier timing information is determined so that the base station does not exceed the CP range.

1-1-3. The base station may detect timing information detected from a plurality of RACH signals and classify the timing information into a similar timing-group. When the classified timing group forms a plurality of groups, the base station may adopt a group having the largest timing group element and include timing information corresponding to the group in the RAR.

2-1. The terminal receiving one RAR may transmit one MSG3.

On the other hand, unlike the assumption of the above 1-1, if it is assumed that a plurality of received RACHs are received from a plurality of terminals, the base station may transmit a plurality of RARs. In this case, the terminal can receive the plurality of RARs.

2-2. The terminal receiving the plurality of RARs may operate as follows depending on which RAR of the plurality of PARs is selected.

2-2-1. The terminal may transmit the MSG3 by selecting the RAR having the largest SNR among the plurality of RARs.

2-2-2. The terminal may transmit the MSG3 by selecting the RAR having the largest timing advance value among the plurality of RARs. As described above, based on the timing at which the propagation delay is largest, it means that the terminal may transmit the uplink signal at the earliest time, and the MSG3 transmission does not collide with the downlink transmission signal of the base station. However, the earlier timing information is determined so that the base station does not exceed the CP range.

2-2-3. The terminal may form a timing group according to timing information among the plurality of RARs, and select a group having the largest timing information among a plurality of timing groups formed, select a RAR based on the group, and transmit the MSG3.

Also, when there is no beam reciprocity, the base station may set a plurality of RACH transmission occasions for a predetermined interval to reduce the total RA time.

Figure 7:
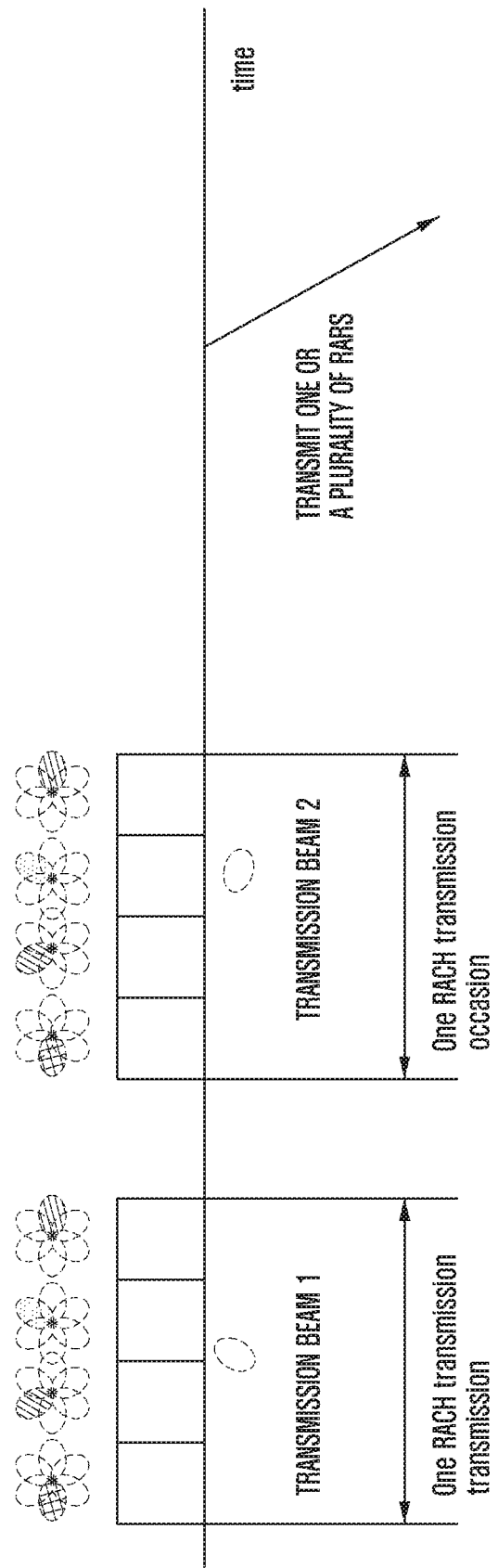
FIG. 7 is a diagram illustrating an embodiment of setting an RACH transmission occasion for a predetermined interval according to the present disclosure.

FIG. 7 is a diagram illustrating an embodiment of setting an RACH transmission occasion for a predetermined interval according to the present disclosure.

Referring to FIG. 7, the base station of the present disclosure may set a density of the RACH transmission for a predetermined interval. That is, one or a plurality of RACH transmission occasions may be allocated for a predetermined interval before the terminal receives the random access response message.

When the terminal may use the reception beam as the transmission beam, the first message may be transmitted using the beam receiving the downlink synchronization signal, but when the terminal may not use the reception beam as the transmission beam, the first message may be transmitted while the beam is altered. As described above, when the terminal may not use the reception beam as the transmission beam, the terminal attempt to receive the second message after transmitting the first message using one beam, and when the terminal fails to receive the second message, the terminal may repeat a process of attempting to transmit the first message using another beam and then receive the second message.

When using such a method, it may take a long time. Therefore, a method for transmitting a first message while altering a beam in a plurality of RACH transmission occasions before a second message is received may be considered.

Therefore, the terminal may transmit the random access preamble on the RACH while altering the transmission beam every RACH transmission occasion. At this time, the base station may transmit the random access response message (MSG2) to the terminal for the detected random access preamble, and it is necessary to identify to which the MSG1 the MSG2 corresponds.

In order to establish the relationship between the MSG2 and the MSG1, the following methods may be considered.

The first method for establishing the relationship between MSG2 and MSG1 is based on the current LTE scheme and may be used for scheduling of the base station.

Figure 8:
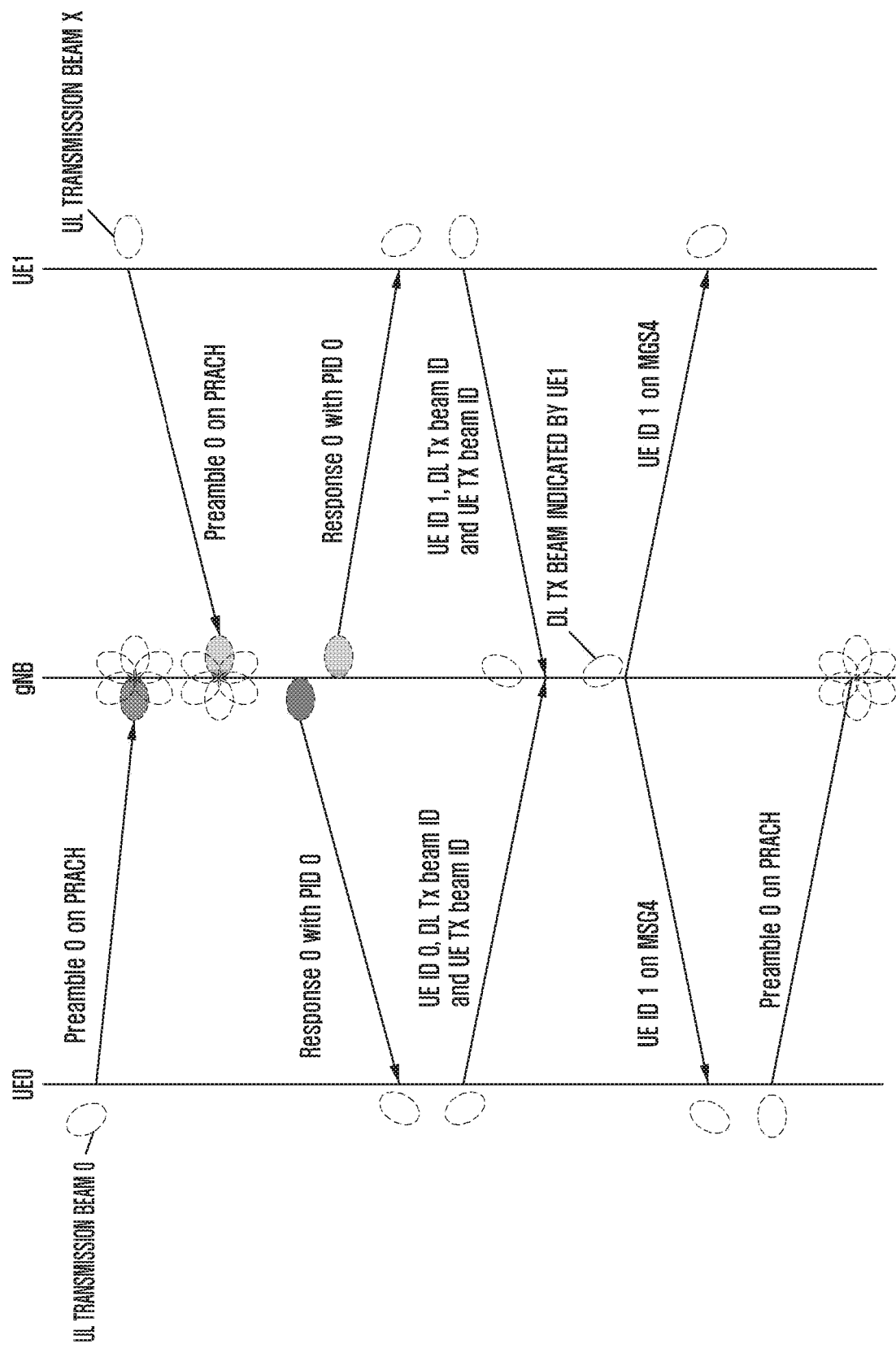
FIG. 8 is a diagram illustrating a random access procedure (RA procedure) according to a first method for establishing a relationship between MSG2 and MSG1.

FIG. 8 is a diagram illustrating a random access procedure (RA procedure) according to a first method for establishing a relationship between MSG2 and MSG1.

FIG. 8 is a diagram showing an RA procedure considering two UEs according to an embodiment of the present disclosure. Here, it is assumed that the terminal identically selects a preamble ID of the RACH preamble (e.g., Preamble 0). At this time, since the preamble sequence is generated by the preamble identifier, it can be regarded as the same concept. That is, the preamble identifier of the present disclosure may mean a preamble sequence. Accordingly, the preamble 0 may mean a preamble sequence corresponding to index 0 among a plurality of preamble sequences. For example, if 64 preamble sequences are generated, the preamble 0 may mean a first preamble sequence.

UE 0 transmits a random access preamble having a Preamble ID 0 using a UL Tx beam 0 on a PRACH, and UE 1 transmits the random access preamble having the preamble ID 0 using an uplink transmission beam (UL Tx beam) x on the PRACH.

The base station (hereinafter, gNB) may detect a preamble (or RACH) transmitted from the UE0 and the UE1 using different receive (Rx) beams.

The gNB detects the preamble (or RACH) having the preamble ID 0 using different Rx beams, but may not determine whether the preamble is transmitted from different terminals or the preamble transmitted from the same terminal undergoes a multi-channel environment.

Accordingly, the gNB transmits a RAR including a PID (Physical ID) 0 based on the detected Preamble ID 0. That is, the base station may transmit a response message 0 having PID 0 to the terminal, and the UE0 and UE1 may each detect the response message 0 having the PID 0. At this time, UE0 and UE1 may receive response message 0 using the selected receive beam while receiving a DL SS/BCH/ beam reference signal (BRS) (the DL RX beam chosen during a group of DL SS/BCH/BRS). Therefore, each terminal that detects a RAR having PID 0 transmits the MSG3 using the same UL Tx beam on the assumption that the previous MSG1 transmission succeed.

In this case, the two MSG3 signals transmitted by the UE0 and the UE1 may interfere with each other and thus the gNB may not detect any MSG3. Therefore, two UEs may not receive an acknowledgment message (also called an Ack message, or MSG4) for the MSG3.

Alternatively, the gNB may detect only one of the two MSG3s. In this case, a process of preventing one UE from being accessed to the gNB and transmitting the MSG1 again is performed.

Referring to FIG. 8, the case in which the base station detects the MSG3 transmitted by the UE1 will be described by way of example. Therefore, the base station may transmit the MSG4 including UE ID 1 to the terminal. Accordingly, the UE1 may access the base station.

However, the UE0 may not access the base station, and the UE0 may alter the transmission beam (UL Tx beam) at the next RACH occasion and transmit the preamble (UE0 alters UL Tx beam during next PRACH occasion).

Here, it should be noted that although the gNB detects the MSG1 of different UEs, it may not confirm whether the MSG1 is transmitted from different UEs and a collision occurs because the MSG2 cannot be transmitted to different UEs. That is, a beamforming-based random access procedure (RA procedure) needs to be defined in consideration of a beam, a RACH transmission resource (RACH transmission resource), and a preamble ID or the like in an LTE-based RA procedure.

A second method for establishing a relationship between MSG2 and MSG1 is a method for transmitting the transmission beam (Tx beam) information including the MSG2. At this time, the transmission beam information may mean transmission beam information of a wireless transmitting and receiving device, such as the base station, the terminal, the relay, a backhaul, and a transmission and reception point (TRP).

The terminal may detect the transmission beam (Tx beam) information included in the MSG2 to determine whether the received MSG2 corresponds to the MSG1 transmitted by the corresponding terminal. The transmission beam level may be divided into the transmission beam of the base station and the transmission beam of the terminal as follows.

When the transmission beam information included in the MSG2 is the transmission beam used when the terminal transmits the MSG1, the terminal may confirm that the MSG2 received is for the MSG1 transmitted by the terminal. Accordingly, the terminal may transmit the MSG3 using the uplink resource allocation information included in the MSG2. In addition, the terminal may transmit the MSG 3 using the terminal beam included in the MSG2.

When the transmission beam information included in the MSG2 is the transmission beam of the base station, the terminal may transmit the base station beam information estimated when receiving the downlink synchronization signal by including the base station beam information in the MSG1. Through this information, the terminal may confirm that the received MSG2 is for the MSG1 transmitted by the terminal. Accordingly, the terminal may transmit the MSG3 using the uplink resource allocation information included in the MSG2. Also, the terminal may transmit the MSG3 using the beam of the terminal corresponding to the transmission beam of the base station.

For this purpose, the base station should be able to estimate the transmission beam (Tx beam) of the base station, the terminal, or other equipment while detecting the RACH in the step of transmitting the MSG1. As the method for the base station to detect the ID of the Tx beam in the step of transmitting the MSG1, the following method may be considered.

1. A method for allowing a set for RA sequences to include Tx beam information
2. A method for allowing a subset of RACH resources to include Tx beam information
3. A method for allowing a time domain OCC index to include Tx beam information
4. A method for allowing a combination of preamble index to include Tx beam information The first method of transmitting the Tx beam information to the base station in the step of transmitting the MSG1 may include a method for increasing the number of RA sequence sets by the number of Tx beam IDs. That is, if the existing LTE has 64 preamble IDs in one cell, the first method may set the preamble ID by 64×N (the number of Tx beams). On the other hand, since the number of Tx beams of the terminal may be different for each terminal or each base station, it is possible to limit the maximum number of Tx beams and define a sequence set accordingly.

A second method of transmitting Tx beam information to a base station in the step of transmitting the MSG1 is a method for allowing the RACH resource to include Tx beam information. As shown in FIG. 3B, a time resource of the subset of RACH resources is already associated with the DL signal/channel. Here, the Tx beam information may be included in a frequency index so that the subset of RACH resources may include the Tx beam information.

Figure 9:
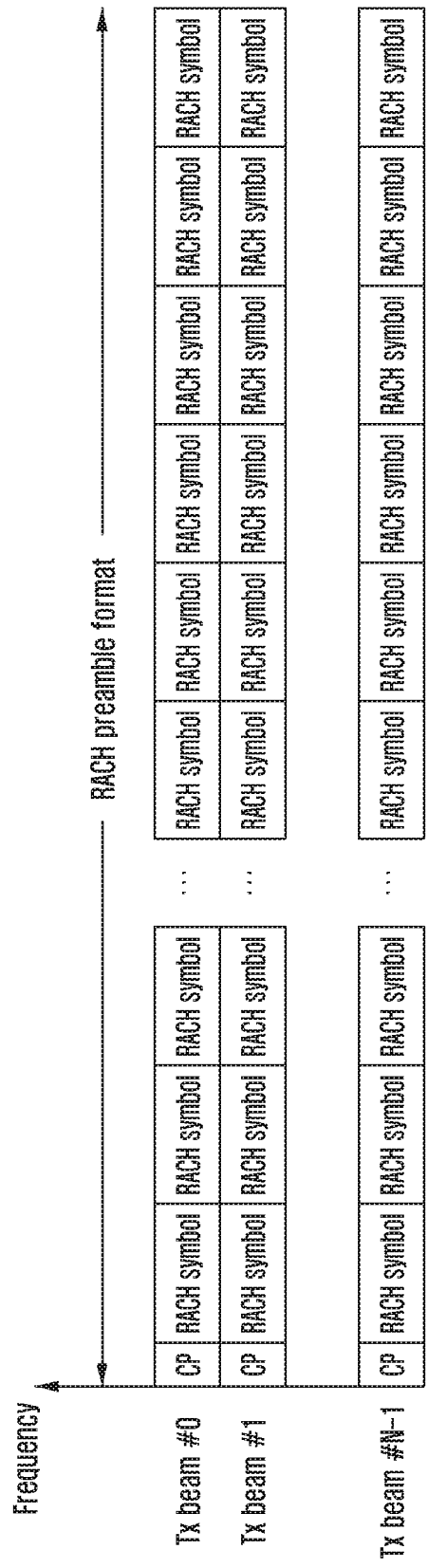
FIG. 9 is a diagram illustrating a method for allowing an RACH resource to include Tx beam information.

FIG. 9 is a diagram illustrating a method for allowing an RACH resource to include Tx beam information.

As shown in FIG. 9, a frequency index of a subset of different RACH resources may include Tx beam information.

A third method for transmitting Tx beam information to a base station in the step of transmitting the MSG1 is a method for allowing a time domain OCC index to include Tx beam information. As described above, as a method for increasing capacity, an orthogonal cover code may be applied over several RACH OFDM symbols or RACH sequences. At this time, the index of the orthogonal cover code may include the Tx beam information. For example, when considering a preamble for transmitting a plurality of RACH symbols, the time domain OCC may be applied to a plurality of preambles having the same preamble identifier. At this time, if there are M OCC indices corresponding to the number N of transmission beams, each OCC index may denote a transmission beam set corresponding to N/M.

A fourth method for transmitting Tx beam information to a base station in the step of transmitting the MSG1 is a method for allowing a combination of preamble identifiers to include Tx beam information. For example, when considering a preamble for transmitting a plurality of RACH symbols, a plurality of preambles may have different preamble identifiers. If the combination of each preamble identifiers corresponds to the number N of transmission beams, the base station may determine which transmission beam was used when the base station detects the combination of preamble identifiers.

A third method for establishing a relationship between MSG2 and MSG1 is a method for setting a time between MSG1 and MSG2.

Figure 10A:
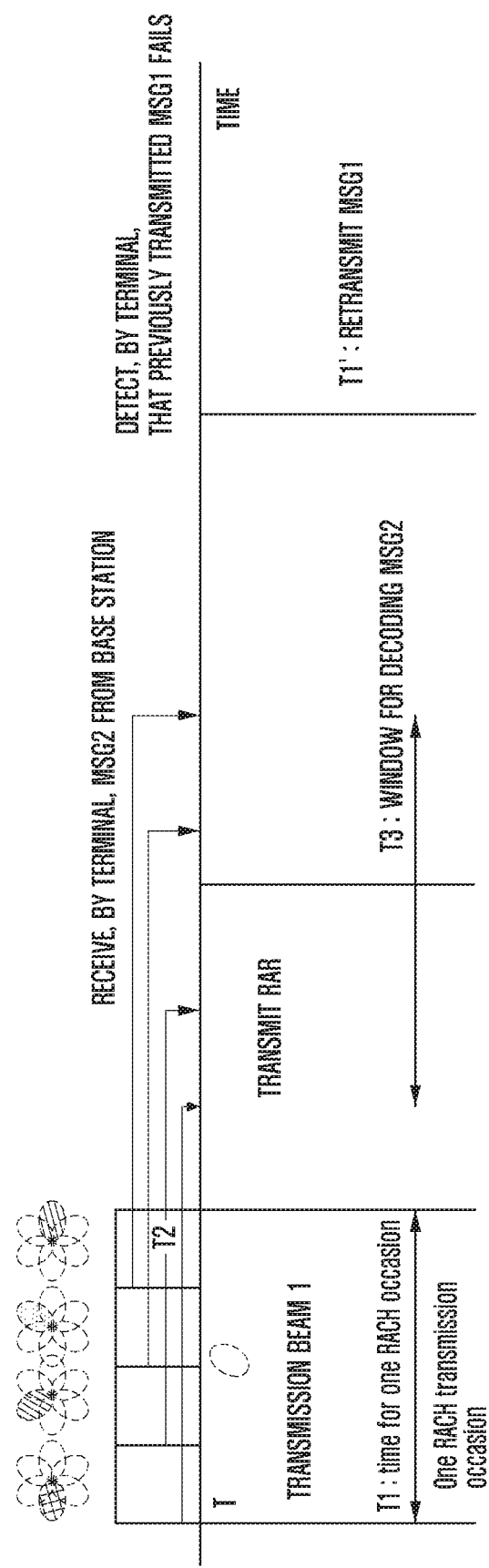
FIGS. 10A and 10B are diagrams showing a method for setting a time between MSG2 and the MSG1.
Figure 10B:
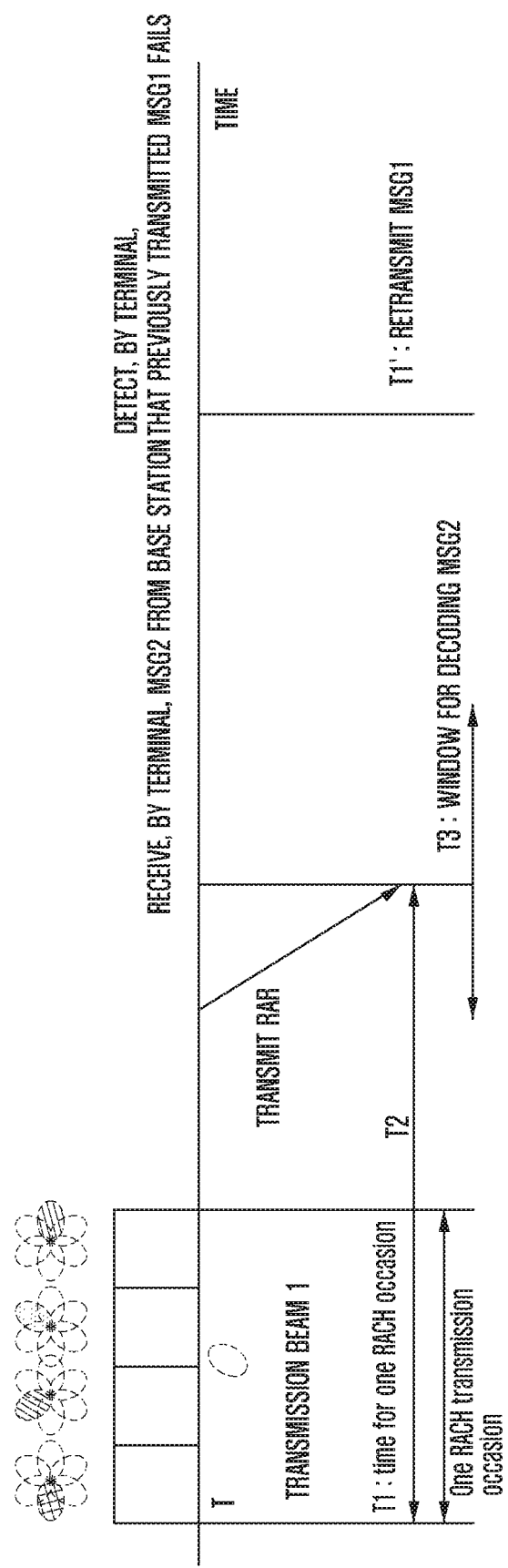

FIGS. 10A and 10B are diagrams showing a method for setting a time between MSG2 and the MSG1.

Referring to FIG. 10A, after the terminal transmits the MSG1, it may be set to receive the MSG2 after a certain time. Therefore, when the terminal transmits the MSG1 and then receives the MSG2 after a certain time, the terminal may recognize a response message to the MSG1 transmitted by the terminal.

In this case, the terminal may transmit the MSG3 using the uplink allocation information included in the MSG2 if there is MSG2 decoded for a predetermined second time after a predetermined first time based on the RACH resource that transmits the MSG1.

Referring to FIG. 10A, the terminal may attempt to decode the MSG2 for a second time T3 at a time point when a first time T2 has elapsed in each RACH resource. This figure shows T3 based on a time point when the MSG1 is transmitted in the first RACH resource, but it is obvious that the T3 interval may be changed.

Accordingly, if the MSG2 received from the base station is received and thus the decoding is successful in the T3 interval, the terminal may transmit the MSG3 using the uplink resource allocation information included in the MSG2.

On the other hand, if the MSG2 is not received after the predetermined time (or there is no MSG2 being decoded) and the MSG2 is received at a time other than the time set for the MSG2 to be received, it may be recognized that the MSG2 is not a response message to the MSG1 of the terminal.

Therefore, the base station may retransmit the MSG1 after a predetermined time T1' has elapsed.

Meanwhile, the base station may transmit the information on the predetermined time to the terminal. For example, the base station may set the MSG2 to receive the MSG2 after a predetermined time or a predetermined subframe after the terminal transmits the MSG1, and the information on the predetermined time or the predetermined subframe may include RACH configuration information transmitted through the SIB or the MIB. Alternatively, the information may be transmitted to the terminal through a high layer (e.g., RRC layer).

Meanwhile, the terminal may transmit the MSG3 using the uplink allocation information included in the MSG2 if there is the MSG2 decoded for the predetermined second time after the predetermined first time for the MSG1 transmitted during the RACH transmission occasion based on the RACH transmission occasion.

Referring to FIG. 10B, the terminal may attempt to decode the MSG2 for the second time T3 at a time point when the first time T2 has elapsed based on the time point when the MSG1 is transmitted at the first RACH resource. However, in this case, the situation in which the MSG1 transmitted from each RACH resource included in the RACH transmission occasion is not be identified may occur.

Accordingly, in the case in which the MSG2 received from the base station is received and thus the decoding succeeds in the T3 interval, when the terminal may transmit the MSG3 using the uplink resource allocation information included in the MSG2, the collision of the MSG3 may occur.

On the other hand, if the MSG2 is not received after the predetermined time (or there is no MSG2 being decoded) and the MSG2 is received at a time other than the time set for the MSG2 to be received, it may be recognized that the MSG2 is not a response message to the MSG1 of the terminal.

Therefore, the base station may retransmit the MSG1 after a predetermined time T1' has elapsed.

Meanwhile, the base station may transmit the information on the predetermined time to the terminal. For example, the base station may set the MSG2 to receive the MSG2 after a predetermined time or a predetermined subframe after the terminal transmits the MSG1, and the information on the predetermined time or the predetermined subframe may include RACH configuration information transmitted through the SIB or the MIB. Alternatively, the information may be transmitted to the terminal through a high layer (e.g., RRC layer).

The time shown in FIG. 10B may be defined as shown in Table 3.

TABLE 3

Transmission and processing time
of MSG1 and MSG2 in RA procedure

| Timeline | Description |
|---|---|
| T | Time at MSG 1 transmission |
| T$_1$ | One RACH occasion |
| T$_2$ | Delay from the time that MSG 1 transmission to the time UE starts decoding MSG 2 |
| T$_3$ | Window for MSG 2 decoding |
| T$_1$' | Time at MSG 1 re-transmission |

The information included in Table 3 may be transmitted to the terminal through the RACH configuration information transmitted through the SIB or the MIB. Alternatively, the information may be transmitted to the terminal through RRC layer signaling.

T denotes the time point when the MSG1 is transmitted. T may be configured according to the RACH configuration information.

T1 denotes the time of one RACH occasion.

T2 denotes a delay time until the decoding is performed after the terminal receives the MSG2.

T3 denotes a window for receiving the MSG2. That is, T3 means the time when the MSG2 is assumed to be received for a predetermined number n of subframes after a predetermined subframe after the transmission of the MSG1. Here, the predetermined number n may be informed the terminal through the RACH configuration information transmitted from the SIB/MIB.

However, when it is assumed that a subset of 'M' RACH resources is utilized at one RACH transmission occasion, the situation in which an RACH preamble transmitted through a subset of m-th (0<m≤M) RACH resource and an RACH preamble transmitted through a subset of a k-th (0<k≤M) RACH resource are not identified occurs.

The following describes the situation in which the collision occurs. The access probability when the MSG1 transmission is attempted m times may be defined as follows.

$$P_m^a(k) = 1 - \prod_{i=1}^{m} (P_i^{dm}(k) + (1 - P_i^{dm}(k)) \times P_c(k))$$

Here, (·) (k), n$_{s,m}$, n$_{d,m}$, n$_d$ and n$_a$ are the values collected during the time between [(k−1) T, kT], the number of RACH preamble transmitted during the attempt time m times, the number of RACH preambles detected during the attempt time m times, the number of detected RACH preambles, and the number of terminals that succeeds in RA.

The detection failure probability at the time of performing the attempt m times is as follows.

$$P_m^{dm}(k) = \begin{cases} 1 - \dfrac{n_{d,m}(k)}{n_{s,m}(k)}, & n_{s,m} > 0 \\ 0, & n_{s,m} = 0 \end{cases}$$

In this case, a contention ratio may be represented as follows.

$$P_c(k) = \begin{cases} 1 - \dfrac{n_a(k)}{n_d(k)}, & n_d > 0 \\ 0, & n_d = 0 \end{cases}$$

That is, in order to reduce the collision probability, a scheme that can reduce the contention ratio is needed. It is the same as raising the probability that the terminal succeeds in RA by the detected RACH preamble. To this end, the contention ratio may be lowered according to the method for setting the time relationship, which is the third method among the methods for establishing a relationship between MSG1 and MSG2 described above.

Meanwhile, as shown in FIG. 10A, the method for establishing a relationship between MSG2 and MSG1 may be designed in consideration of one or a plurality of RACH resources (RACH resources) in the RACH transmission occasion as shown in Table 4 below.

TABLE 4

Method for establishing a relationship between
MSG1 and MSG2 in beamforming system

| Timeline | Description |
|---|---|
| T | Time at MSG 1 transmission |
| T$_{1, k}$ | k-th subset of RACH resource in one RACH occasion |

TABLE 4-continued

Method for establishing a relationship between
MSG1 and MSG2 in beamforming system

| Timeline | Description |
|---|---|
| $T_2$ | Delay from the time that MSG 1 transmission to the time UE starts decoding MSG 2 |
| $T_3$ | Window for MSG 2 decoding |
| $T_1'$ | Time at MSG 1 re-transmission |

The time T1 shown in Table 3 denotes one RACH transmission occasion while $T_{1,k}$ shown in Table 4 may include a time index of a subset of RACH resources within one RACH transmission occasion.

That is, a plurality of subsets of RACH resources may be included in one RACH transmission occasion, and $T_{1,k}$ may denote an index of a plurality of subsets of RACH resources. Therefore, the terminal transmitting the MSG1 in the RACH resource subset indicated by the index may decode the MSG2 for the T3 time after the T2 time, and if there is the MSG2 decoded for the T3 time, the MSG3 may be transmitted using the uplink resource allocation information included in the MSG2. On the other hand, if there is no MSG2 to be decoded, the MSG1 may be retransmitted after T1' time.

The fourth method for establishing the relationship between MSG1 and MSG2 is a method for using a preamble ID. In the present disclosure, the preamble ID may mean a preamble sequence. The method for using a preamble ID may be generated as follows in consideration of a subset of RACH resources.

1. Designed so that the Preamble ID includes a time index of a subset of RACH resources
2. Designed so that the Preamble ID includes a frequency index of a subset of RACH resources
3. Designed so that the Preamble ID includes a frequency/time index of a subset of RACH resources The RACH preamble ID in the LTE is generated as follows. In the LTE, 64 preamble IDs are operated, and the terminal may select a root index for generating a preamble sequence (RACH OFDM symbol) through parameters transmitted in the SIB2 (base sequence). The terminal may extend the preamble ID according to a cyclic shift value interval (Ncs) based on the selected root index. At the root index for one RACH OFDM symbol, if the number of preamble IDs extended by the CS value is less than 64, the terminal selects the next root index to extend the preamble ID. Similarly, even in the extended root index, the preamble ID is extended according to Ncs. In this way, a total of 64 preamble IDs are generated.

The method for generating a preamble ID according to the present disclosure may be generated by extending the time or frequency index of the subset of RACH resources in the method for generating a preamble ID in LTE. In the case of the preamble format 1 shown in the above Table 1, the preamble ID may be generated by the same manner as the LTE.

In the case of the preamble format 2 (2.1~2.5) for the high frequency system, it is difficult to extend the preamble ID in the same manner as the LTE. The reason is that the spacing between the sub carriers is very large compared to the LTE as the symbol length is short, and thus it is difficult to long allocate a length of the sequence in the frequency domain as in the LTE. Therefore, when the root index for generating different preamble sequences (RACH OFDM symbols) is used in the same resource, the influence of interference becomes very large, such that the number of root indexes used in the subset of RACH resources is very small, which means that it is difficult to extend the preamble ID as in the LTE.

Therefore, as in the proposed method, the terminal may generate the preamble ID including information indicating the RACH resource, such that the preamble ID may represent the relationship between the MSG1 and the MSG2. Therefore, when the terminal detects the MSG2, the terminal may determine based on which RACH resource the MSG1 transmission succeeds.

However, as described above, the information representing the RACH resource may be associated with the downlink signal or channel. Accordingly, in the present disclosure, the information representing the downlink signal or channel may be used to generate the preamble ID. For example, the time or frequency index of the subframe that receives the downlink synchronization signal may be used to generate the preamble ID. However, the embodiment of the present disclosure is not limited thereto, and the subframe or the downlink signal receiving the reference signal or the broadcast signal may be used to generate the preamble ID.

Figure 11:
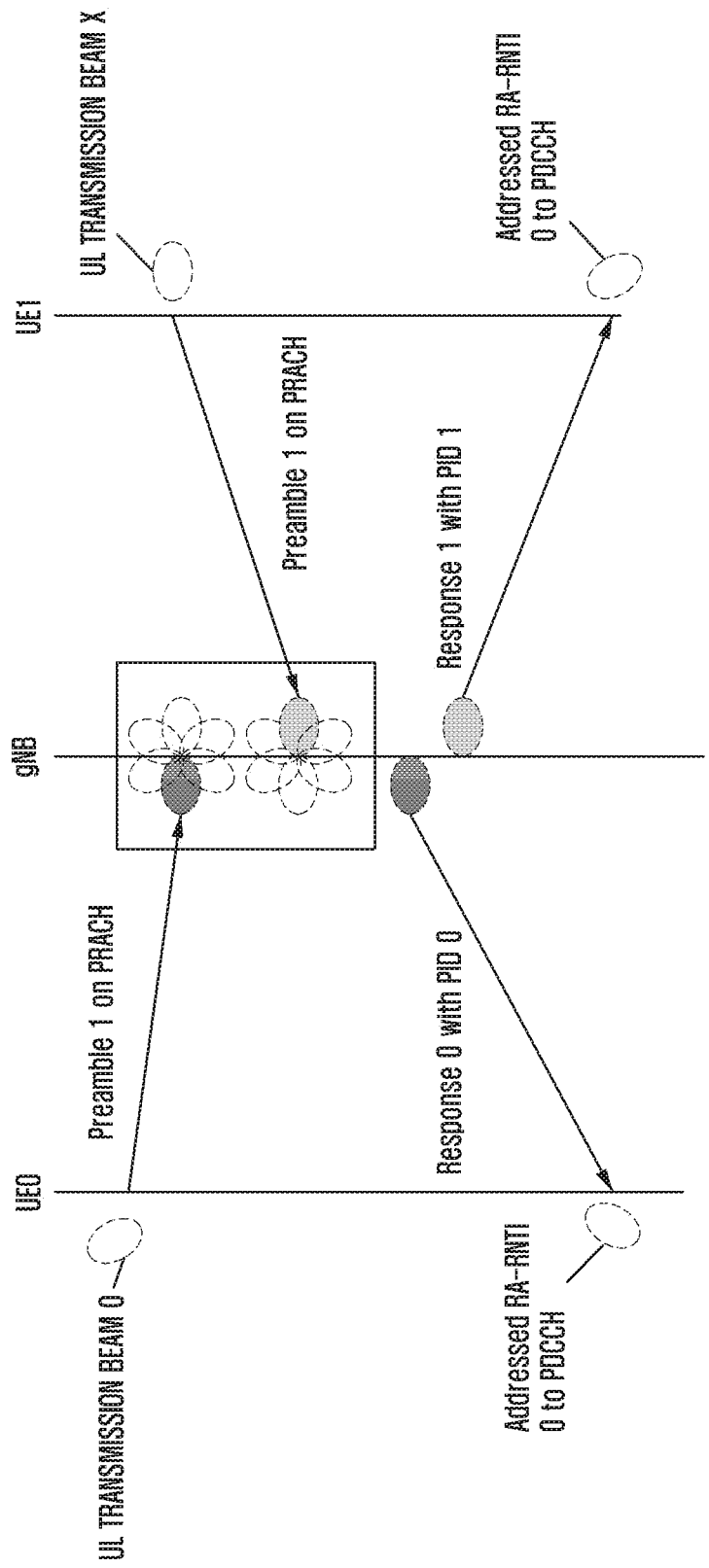
FIG. 11 is a diagram illustrating a relationship between MSG1 and MSG2 depending on a preamble ID according to an embodiment of the present disclosure.

FIG. 11 is a diagram illustrating a relationship between MSG1 and MSG2 depending on a preamble ID according to an embodiment of the present disclosure.

The UE0 and the UE1 may select the same root index and use the selected root index to generate the same preamble sequence. In addition, the UE0 and the UE1 may transmit the MSG1 in the same subframe. Here, the embodiment in which the MSG1 is transmitted using the same subframe but using a subset of different RACH resources is shown.

The base station may detect the preamble ID in different RACH resources when receiving the RACH. Here, the base station in which the beam reciprocity is established may determine that different preamble IDs are the preamble IDs transmitted from the different terminals. On the other hand, the base station in which the beam reciprocity is not established may not determine whether the preamble IDs detected in different RACH resources are RACH preamble IDs transmitted from the same terminal or RACH preamble IDs transmitted from different terminals.

Accordingly, the base station may assign an identifier (e.g., physical ID (PID)) according to the time or frequency index of the subset of RACH resources detected by the base station, and generate the RAR including the identifier and transmit the generated RAR to the terminal. Here, the time or frequency index of the subset of the RACH resources may be represented by the OFDM symbol index/slot index/subframe index of the time when the RACH is transmitted, the starting point of the frequency domain or the like.

Thus, by transmitting response messages including different PIDs to each terminal even for the same preamble ID, the terminal may confirm whether or not it is the response message transmitted to the terminal.

Referring to FIG. 11, the base station may transmit a RAR including PID 0 to the UE0 and a RAR including PID1 to the UE1.

Accordingly, the terminal may detect the PID according to the preamble ID used for the MSG1 transmission among the received RARs and select the MSG2 suitable for the terminal. That is, the terminal may decode the MSG2 to detect the PID, and transmit the MGS3 according to the uplink resource allocation information included in the MSG2 in which the PID corresponding to the time or frequency index of the RACH resource transmitted by the MSG1 is detected.

A fifth method for establishing a relationship between MSG1 and MSG2 is a method for using RA-RNTI. The RA-RNTI is defined as follows in the LTE.

$$RA\text{-}RNTI = 1 + t_{id} + f_{id}$$

where $t_{id}$: index of the first subframe ($0 <= t_{id} < 10$)

$f_{id}$: location of PRACH transmission in frequency domain ($0 <= f_{id} <= 6$)

The terminal transmitting the MSG1 monitors the PDCCH for the RAR. That is, the terminal monitors whether there is the RAR transmitted through the PDCCH. Here, the RAR transmitted through the PDCCH is divided into RA-RNTIs. That is, the terminal may identify the PDCCH indicating the RAR to be transmitted to the terminal using the RA-RNTI.

When the terminal transmits the MSG1 using the same frequency resource in the same subframe, the RA-RATI value is the same and the PDCCH according to the value is the same, such that the terminal decodes the PDCCH and decodes the MSG2 indicated by the PDCCH. That is, if the terminal uses the same preamble ID and transmits the MSG1 in the same RA-RNTI, even if the base station detects the RACH in the subset of different RACH resources, the base station may not identify that the MSG1 is transmitted from different terminals.

Accordingly, in the present disclosure, a method for associating RA-RNTI with a subset of different RACH resources and identifying MSG2 by a terminal will be described. A method for associating RA-RNTI with a subset of RACH resources is as follows.

1. A time index of a subset of RACH resources may be used to generate the RA-RNTI.

RA-RNTI=1+t_id, t_id: Time index of a subset of RACH resources

2. A frequency index of a subset of RACH resources may be used to generate the RA-RNTI.

RA-RNTI=1+f_id, f_id: Frequency index of a subset of RACH resources

3. A time or frequency index of a subset of RACH resources may be used to generate the RA-RNTI.

RA-RNTI=1+t_id+f_id

4. A subframe index and a time or frequency index of a subset of RACH resources may be used to generate the RA-RNTI.

RA-RNTI=1+t_id+f_id+index of the subframe

However, as described above, the information representing the RACH resource may be associated with the downlink signal or channel. Accordingly, in the present disclosure, the information representing the downlink signal or channel may also be used to generate the RA-RNTI. For example, the time or frequency index of the subframe that receives the downlink synchronization signal may be used to generate the RA-RNTI. However, the embodiment of the present disclosure is not limited thereto, and the subframe or the downlink signal receiving the reference signal or the broadcast signal may be used to generate the RA-RNTI.

Figure 12:
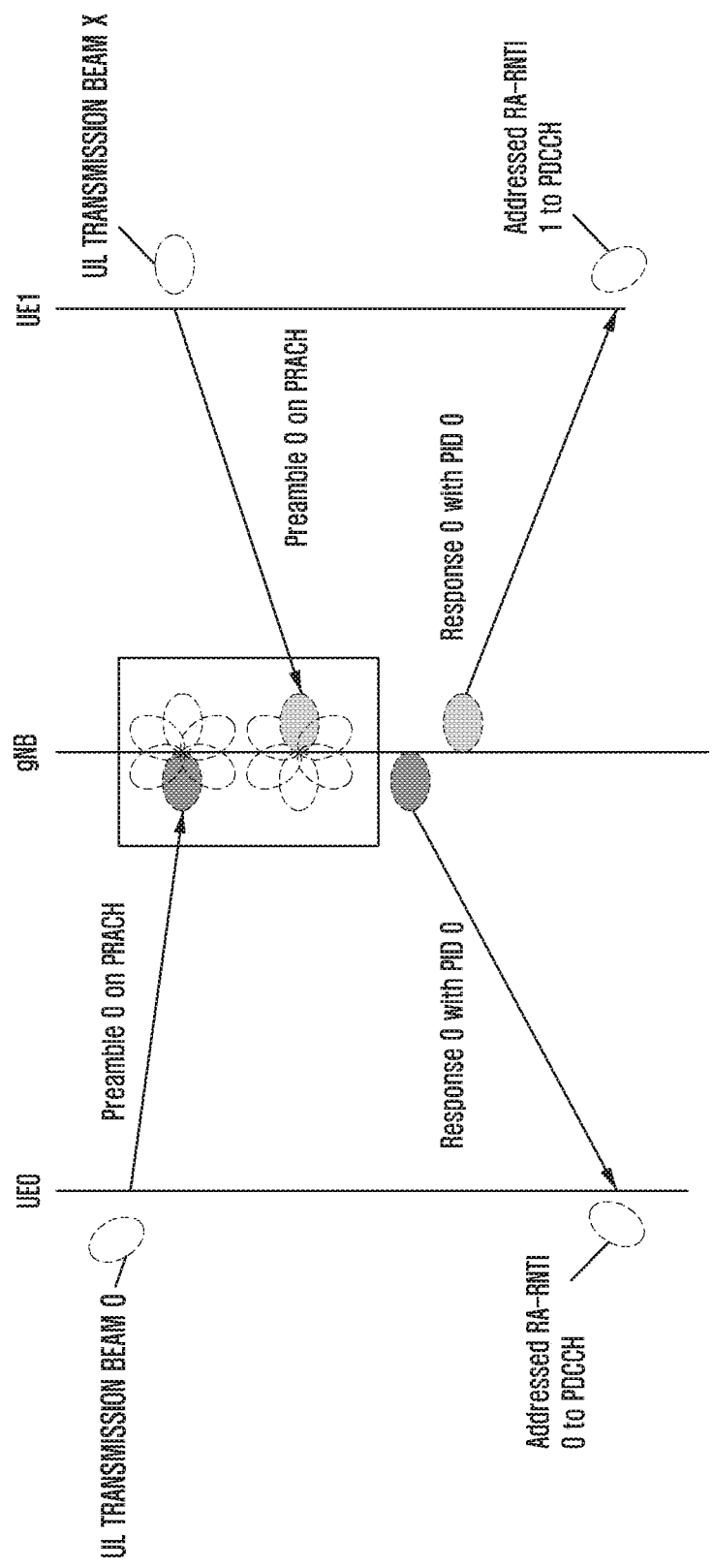
FIG. 12 is a diagram illustrating a relationship between the MSG1 and the MSG2 depending on RA-RNTI according to an embodiment of the present disclosure.

FIG. 12 is a diagram illustrating a relationship between the MSG1 and the MSG2 depending on RA-RNTI according to an embodiment of the present disclosure.

FIG. 12 illustrates an embodiment for decoding a RAR when a time or frequency index and a subframe index of a subset of RACH resources are associated with RA-RNTI.

UE0 and UE1 transmit the same RACH preamble through a subset of different RACH resources. Therefore, the base station may detect the same RACH sequence in different RACH resources. Here, the base station in which the beam reciprocity is not established may not identify whether it is an RACH sequence transmitted from different terminals or an RACH sequence transmitted from the same terminal. The base station in which the beam reciprocity is established may identify an RACH sequence transmitted from different terminals. Since the Preamble ID (RACH sequence) is the same, the PID included in MSG2 is also the same.

However, in the case of using the above-described method, since the MSG1 is transmitted in different RACH resources, the RA-RNTI may be determined differently for each terminal. Therefore, since the RA-RNTIs used for scrambling CRC of control information which points to the MSG2 are different from each other, two terminals each may decode the control information corresponding to the RA-RNTI suitable for the terminals. In addition, the MSG2 included in the control information can be decoded.

The sixth method for establishing a relationship between MSG1 and MSG2 is a method for using a scrambling ID of MSG2. The following describes the method for establishing a relationship between MSG1 and MSG2 using the scrambling ID of MSG2. The scrambling initial value is defined as follows in the LTE.

$$c_{init} = \begin{cases} n_{RNTI} \cdot 2^{14} + q \cdot 2^{13} + \lfloor n_s/2 \rfloor \cdot 2^9 + N_{ID}^{cell} & \text{for } PDSCH \\ \lfloor n_s/2 \rfloor \cdot 2^9 + N_{ID}^{MBSFN} & \text{for } PMCH \end{cases}$$

The scrambling ID may be determined according to the scrambling initial value determined as described above. Here, the MSG2 is transmitted on the PDSCH. Here, n_RNTI represents an RNTI associated with PDSCH, q represents a codeword, ns represents a slot number, and NcellID represents a cell ID.

Accordingly, the present disclosure proposes a method for applying PDSCH scrambling differently by using a subset of RACH resources when generating an initial value (Cinit) value. The terminal may decode the MSG2 suitable for the terminal by scrambling the MSG2 using different scrambling.

Specifically, a method for associating a scrambling initial value with a subset of RACH resources is as follows 1. Use the time index of the subset of RACH resources to generate the scramble ID of the MSG2

2. Use the frequency index of the subset of RACH resources to generate the scramble ID of the MSG2

3. Use the frequency or time index of the subset of RACH resources to generate the scramble ID of the MSG2

However, as described above, the information representing the RACH resource may be associated with the downlink signal or channel. Accordingly, in the present disclosure, the information representing the downlink signal or channel may also be used to generate the scrambling ID. For example, the time or frequency index of the subframe that receives the downlink synchronization signal may be used to generate the scrambling ID. However, the embodiment of the present disclosure is not limited thereto, and the subframe or the downlink signal receiving the reference signal or the broadcast signal may be used to generate the scrambling ID.

Figure 13:
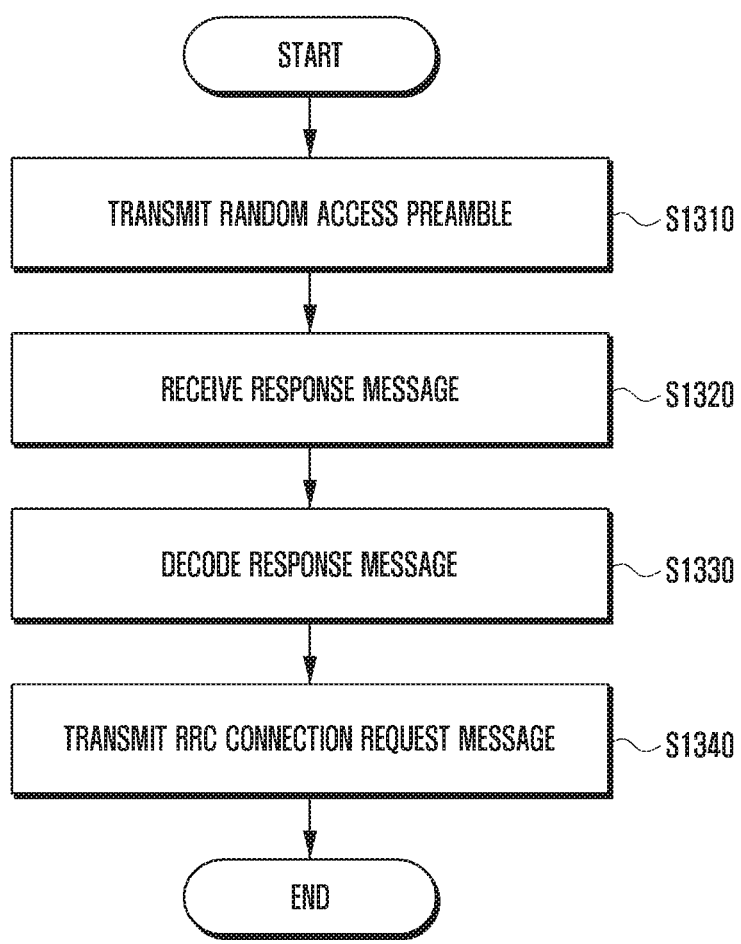
FIG. 13 is a diagram illustrating an operation sequence of a terminal according to an embodiment of the present disclosure.

FIG. 13 is a diagram illustrating an operation sequence of a terminal according to an embodiment of the present disclosure.

Referring to FIG. 13, in step S1310, the terminal may transmit the random access preamble to the base station.

The terminal may receive the system information through the broadcast channel before transmitting the random access preamble, and the system information may include random access related configuration information (RACH configuration information). The random access related configuration information may include the root index information for generating the random access preamble.

In addition, the random access related configuration information may further include time information for use in decoding the above-described response message or the like.

If the base station has the beam reciprocity, the terminal may transmit the random access preamble in the RACH resource associated with the downlink signal or channel. On the other hand, when the base station does not have the beam reciprocity, the terminal may transmit the random access preamble in the RACH transmission occasion including the plurality of RACH resources.

In step S1320, the terminal may receive the response message to the random access preamble. The terminal may receive the response message using the selected reception beam while receiving the DL SS/BCH/BRS.

In step S1330, the terminal may decode the response message using the resource index to which the downlink signal is transmitted. Alternatively, the terminal may decode the response message using the index of the resource including the downlink channel.

The terminal may perform the downlink synchronization by receiving the downlink synchronization signal from the base station before transmitting the random access preamble, and the terminal may decode the response message based on the resource that receives the downlink synchronization signal. Alternatively, the terminal may receive the system information, the broadcast information or the like from the base station through the broadcast channel before transmitting the random access preamble, and the terminal may decode the response message based on the resource that receives the system information or the broadcast information.

The decoding step will be described in detail as follows.

The base station may transmit the response message including the transmission beam information, and if the response message includes information corresponding to the transmission beam information of the terminal or the estimated transmission beam information of the base station, the terminal may decode the message.

In this case, the transmission beam information may be associated with a resource index to which the downlink signal is transmitted or a resource index in which the downlink channel is included, and the terminal may determine the transmission beam information using the resource index to which the downlink signal is transmitted or the resource index in which the downlink channel is included and decode the response message using the determined information.

Alternatively, the base station may define the time between the random access preamble and the random access response message, and the terminal may decode the random access response message when the random access response message is received for the calculated time based on the time when the random access preamble is transmitted.

In this case, the resource transmitting the random access preamble may be associated with the resource index to which the downlink signal is transmitted or the resource index in which the downlink channel is included, and the terminal may determine the time when the random access preamble is transmitted and the time when the random access response is received based on the resource index to which the downlink signal is transmitted or the resource index in which the downlink channel is included and confirm whether the response message is received by monitoring the PDCCH for the time. Accordingly, if the response message is received for the time, the terminal may recognize that the response message is for the preamble transmitted by the terminal, and decode the response message.

Alternatively, when transmitting the random access preamble, the terminal may determine the RACH resource based on the preamble sequence and transmit the determined RACH resource to the base station. When determining the preamble sequence, the terminal may use the time or frequency index of the resource to transmit the preamble.

In this case, the resource to transmit the preamble may be associated with the resource index to which the downlink signal is transmitted or the resource index in which the downlink channel is included, and the terminal may determine the time or frequency when the random access preamble is transmitted based on the resource index to which the downlink signal is transmitted or the resource index in which the downlink channel is included and may generate the preamble sequence using the determined time or frequency and transmit the generated preamble sequence to the base station.

Accordingly, the base station may identify which RACH resource the received random access preamble is transmitted from, and may transmit to the terminal the response message in which the physical identifier (PID) is differently allocated according to the time or frequency index of the RACH resource.

Accordingly, the terminal may decode the response message to detect the PID and determine whether it corresponds to the time or frequency index of the RACH resource that transmits the random access preamble.

Alternatively, the terminal may scramble the control information indicating the resource to which the response message is to be transmitted using the RA-RNTI determined based on the time or frequency index of the RACH resource. Specifically, the base station may scramble the control information using the RA-RNTI generated using the time or frequency index of the RACH resource to which the preamble is transmitted, and the terminal may descramble the control information using the RA-RNTI and decode the response message received at the resource indicated by the control information.

As described above, the resource to transmit the preamble may be associated with the resource index to which the downlink signal is transmitted or the resource index in which the downlink channel is included, and the terminal may determine the time or frequency to which the random access preamble is to be transmitted based on the resource index to which the downlink signal is transmitted or the resource index in which the downlink channel is included and generate the RA-RNTI using the determined time or frequency to descramble the control information. The terminal may decode the response message in the resource indicated by the descrambled control information.

Alternatively, the terminal may decode the response message using the scrambling ID determined based on the time or frequency index of the RACH resource. Therefore, the terminal may decode the response message using the scrambling ID determined based on the time or frequency index of the RACH resource.

As described above, the resource to transmit the preamble may be associated with the resource index to which the downlink signal is transmitted or the resource index in which the downlink channel is included, and the terminal may determine the time or frequency to which the random access preamble is to be transmitted based on the resource index to which the downlink signal is transmitted or the resource index in which the downlink channel is included and generate the scrambling ID using the determined time or frequency to decode the response message.

After decoding the response message using the above method, the terminal may transmit the RRC connection request message to the base station in step S1340. The terminal may transmit the RRC connection request message using the uplink resource allocation information included in the response message.

Figure 14:
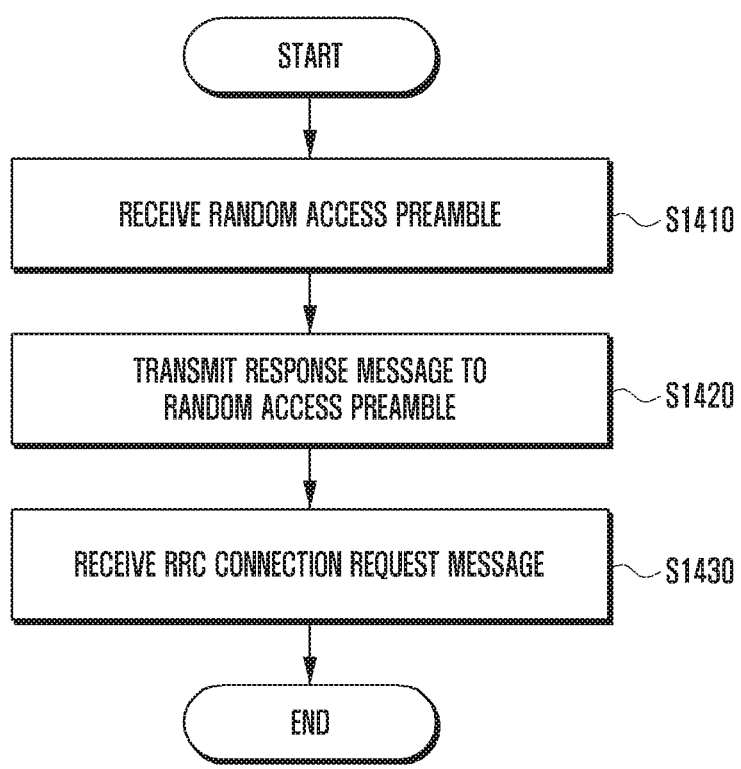
FIG. 14 is a diagram illustrating an operation sequence of a base station according to an embodiment of the present disclosure.

FIG. 14 is a diagram illustrating an operation sequence of a base station according to an embodiment of the present disclosure.

Referring to FIG. 14, the base station may receive the random access preamble in step S1410. At this time, the plurality of terminals may receive the same random access preamble at one RACH transmission occasion. Therefore, the base station may identify the random access preamble to transmit the response message.

In step S1420, the base station may transmit the response message to the random access preamble. At this time, the base station may include specific information so that the terminal can identify the response message, or process the message using the specific information. That is, the base station may generate the response message based on the specific information. At this time, the specific information may be determined based on a resource index to which the downlink signal is transmitted or the resource index in which the downlink channel is included.

Accordingly, the terminal may decode the response message using the resource index to which the downlink signal is transmitted. Alternatively, the terminal may decode the response message using the resource index in which the downlink channel is included.

A process of transmitting a response message by the base station will be described in detail as follows.

The base station may transmit the response message including the transmission beam information. The base station may estimate the transmission beam and include the estimated transmission beam in the response message.

In this case, the transmission beam information may be associated with a resource index to which the downlink signal is transmitted or a resource index in which the downlink channel is included, and the base station may determine the transmission beam information using the resource index to which the downlink signal is transmitted or the resource index in which the downlink channel is included and include the determined transmission beam information in the response message.

Therefore, the response message may be decoded based on the resource index to which the downlink signal is transmitted or the resource index in which the downlink channel is included.

Alternatively, the base station may define the time between the random access preamble and the random access response message, and may transmit the random access response message after a predetermined time in the RACH resource to which the corresponding preamble is transmitted.

In this case, the resource transmitting the random access preamble may be associated with the resource index to which the downlink signal is transmitted or the resource index in which the downlink channel is included, and the terminal may determine the time when the random access preamble is transmitted and the time when the random access response is received based on the resource index to which the downlink signal is transmitted or the resource index in which the downlink channel is included and confirm whether the response message is received by monitoring the PDCCH for the time. Accordingly, if the response message is received for the time, the terminal may recognize that the response message is the preamble transmitted by the terminal, and decode the response message. That is, the response message may be decoded based on the resource index to which the downlink signal is transmitted or the resource index in which the downlink channel is included.

Alternatively, when transmitting the random access preamble, the terminal may determine the RACH resource based on the preamble sequence and transmit the determined RACH resource to the base station. Accordingly, the base station may identify which resource the preamble is transmitted using the received preamble sequence, and may transmit to the terminal the response message in which the physical identifier (PID) is differently allocated according to the time or frequency index of the corresponding resource.

In this case, the resource to which the preamble is to be transmitted may be associated with the resource index to which the downlink signal is transmitted or the resource index in which the downlink channel is included, and the response message may be decoded based on the resource index to which the downlink signal is transmitted or the resource index in which the downlink channel is included.

Alternatively, the base station may scramble the control information using the RA-RNTI generated using the time or frequency index of the RACH resource to which the preamble is transmitted. Therefore, the terminal may descramble the control information using the RA-RNTI and decode the response message received from the resource indicated by the control information.

As described above, the resource to which the preamble is to be transmitted may be associated with the resource index to which the downlink signal is transmitted or the resource index in which the downlink channel is included, and the response message may be decoded based on the resource index to which the downlink signal is transmitted or the resource index in which the downlink channel is included.

Alternatively, the base station may scramble the response message using the scrambling ID determined based on the time or frequency index of the RACH resource. Therefore, the terminal may decode the response message using the scrambling ID determined based on the time or frequency index of the RACH resource.

As described above, the resource to which the preamble is to be transmitted may be associated with the resource index to which the downlink signal is transmitted or the resource index in which the downlink channel is included, and the response message may be decoded based on the resource index to which the downlink signal is transmitted or the resource index in which the downlink channel is included.

Also, the base station may include the uplink resource allocation information in the response message. Therefore, after transmitting the response message, the base station may receive the RRC connection request message in step S1430. The base station may receive the RRC connection request message from the resource according to the uplink resource allocation information included in the response message.

Figure 15:
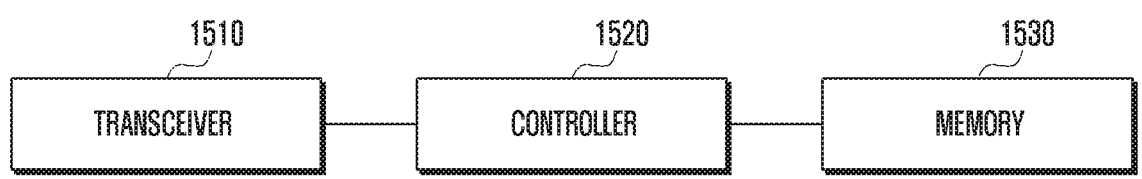
FIG. 15 is a diagram illustrating a structure of the terminal according to an embodiment of the present disclosure.

FIG. 15 is a diagram illustrating a structure of the terminal according to an embodiment of the present disclosure.

Referring to FIG. 15, the terminal may include a transceiver 1510, a controller 1520, and a memory 1530.

The transceiver 1510 may transmit/receive a signal to/from the base station, and may include an interface unit for it. For example, the transceiver 1510 may receive the random access related configuration information, a synchronization signal, transmit the random access preamble, and receive the response message thereto from the base station.

The controller 1520 may control the operation of the terminal and may control the terminal to perform the operations described in the embodiment. Also, the controller 1520 may include at least one processor. Further, the processor may be controlled by a program including instructions that execute the methods described in the embodiments of the present specification. Further, the program may be stored in a storage medium, and the storage medium may include a volatile or non-volatile memory. The memory may be a medium capable of storing data, and the form thereof is not limited as long as it stores the instructions.

More specifically, the controller 1520 may perform a control to transmit the random access preamble to the base station. The controller 1520 may receive the response message to the random access preamble. The concrete contents in which the controller 1520 transmits and receives the random access preamble are the same as those described above, and will be omitted below.

The controller 1520 may decode the response message using the resource index to which the downlink signal is transmitted. Alternatively, the controller 1520 may decode the response message using the resource index in which the downlink channel is included.

The controller 1520 may perform the downlink synchronization by receiving the downlink synchronization signal from the base station before transmitting the random access preamble, and the controller 1520 may decode the response message based on the resource that receives the downlink synchronization signal. Alternatively, the controller 1520 may receive the system information, the broadcast information or the like from the base station through the broadcast channel before transmitting the random access preamble, and the terminal may decode the response message based on the resource that receives the system information or the broadcast information.

The detailed content of the decoding step is the same as those described above and therefore will be omitted below.

After decoding the response message using the above method, the controller 1520 may transmit the RRC connection request message to the base station. The controller 1520 may transmit the RRC connection request message using the uplink resource allocation information included in the response message.

Figure 16:
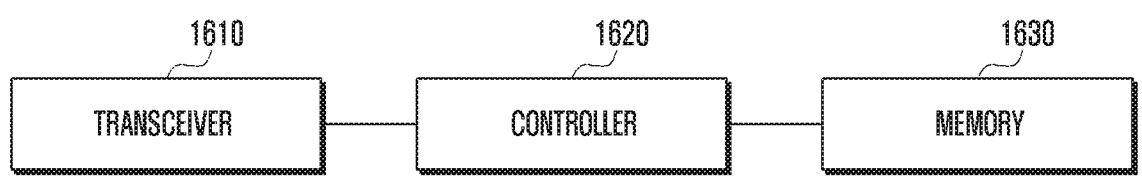
FIG. 16 is a diagram illustrating a structure of the base station according to an embodiment of the present disclosure.

FIG. 16 is a diagram illustrating a structure of the base station according to an embodiment of the present disclosure.

Referring to FIG. 16, the base station may include a transceiver 1610, a controller 1620, and a memory 1630.

The transceiver 1610 may transmit/receive a signal to/from the terminal, and may include an interface unit for it. For example, the transceiver 1510 may transmit the random access related configuration information and the synchronization signal to the terminal, receive the random access preamble, and transmit the response message thereto.

The controller 1620 may control the operation of the terminal and may control the terminal to perform the operations described in the embodiment. Also, the controller 1620 may include at least one processor. Further, the processor may be controlled by a program including instructions that execute the methods described in the embodiments of the present specification. Further, the program may be stored in a storage medium, and the storage medium may include a volatile or non-volatile memory. The memory may be a medium capable of storing data, and the form thereof is not limited as long as it stores the instructions.

More specifically, the controller 1620 may receive the random access preamble. At this time, the plurality of terminals may receive the same random access preamble at one RACH transmission occasion. Therefore, the base station may identify the same to transmit the response message.

The controller 1620 may transmit the response message to the random access preamble. At this time, the controller 1620 may include the specific information so that the terminal can identify the response message, or process the message using the specific information. That is, the base station may generate the response message based on the specific information. At this time, the specific information may be determined based on a resource index to which the downlink signal is transmitted or the resource index in which the downlink channel is included.

The concrete contents of the process of transmitting, by the controller 1620, a response message are the same as those described above, and will be omitted below.

Also, the controller 1620 may include the uplink resource allocation information in the response message. Therefore, after transmitting the response message, the controller 1620 may receive the RRC connection request message. The controller 1620 may receive the RRC connection request message from the resource according to the uplink resource allocation information included in the response message.

Meanwhile, although the exemplary embodiments of the present disclosure have been illustrated in the present specification and the accompanying drawings and specific terms have been used, they are used in a general meaning in order to assist in the understanding the present disclosure and do not limit the scope of the present disclosure. It is obvious to those skilled in the art to which the present disclosure pertains that various modifications may be made without departing from the scope of the present disclosure, in addition to the exemplary embodiments disclosed herein.

What is claimed is:

1. A method performed by a terminal in a wireless communication system, the method comprising:
    identifying a random access channel (RACH) occasion corresponding to a synchronization signal block (SSB) on which a downlink synchronization signal is received;
    transmitting, to a base station, a random access preamble in the RACH occasion;
    monitoring a physical downlink control channel (PDCCH) based on a random access-radio network temporary identifier (RA-RNTI), the RA-RNTI being identified based on an index of an orthogonal frequency division multiplexing (OFDM) symbol associated with the RACH occasion and a frequency index associated with the RACH occasion; and
    receiving, from the base station, a random access response (RAR) message based on the monitoring.

2. The method of claim 1, wherein the RACH occasion is identified based on RACH configuration information included in system information.

3. The method of claim 1, wherein the RAR message is received based on beam information associated with the SSB.

4. The method of claim 1, wherein the RAR includes an uplink grant, timing advance command, and temporary cell radio network temporary identifier (C-RNTI).

5. A method performed by a base station in a wireless communication system, the method comprising:
- receiving, from a terminal, a random access preamble in a random access channel (RACH) occasion;
- transmitting, to the terminal, downlink control information (DCI) based on a random access-radio network temporary identifier (RA-RNTI), the RA-RNTI being identified based on an index of an orthogonal frequency division multiplexing (OFDM) symbol associated with the RACH occasion and a frequency index associated with the RACH occasion; and
- transmitting, to the terminal, a random access response (RAR) message based on the DCI,
- wherein the RACH occasion corresponds to a synchronization signal block (SSB) on which a downlink synchronization signal is transmitted.

6. The method of claim 5, wherein the RACH occasion is identified based on RACH configuration information included in system information.

7. The method of claim 5, wherein the RAR message is transmitted based on beam information associated with the SSB.

8. The method of claim 5, wherein the RAR includes an uplink grant, a timing advance command, and a temporary cell radio network temporary identifier (C-RNTI).

9. A terminal in a wireless communication system, the terminal comprising:
- a transceiver; and
- a controller configured to:
  - identify a random access channel (RACH) occasion corresponding to a synchronization signal block (SSB) on which a downlink synchronization signal is received,
  - transmit, to a base station via the transceiver, a random access preamble in the RACH occasions,
  - monitor a physical downlink control channel (PDCCH) based on a random access-radio network temporary identifier (RA-RNTI), the RA-RNTI being identified based on an index of an orthogonal frequency division multiplexing (OFDM) symbol associated with the RACH occasion and a frequency index associated with the RACH occasion, and
  - receive, from the base station via the transceiver, a random access response (RAR) message based on the monitoring.

10. The terminal of claim 9, wherein the RACH occasion is identified based on RACH configuration information included in system information.

11. The terminal of claim 9, wherein the RAR message is received based on beam information associated with the SSB.

12. The terminal of claim 9, wherein the RAR includes an uplink grant, timing advance command, and temporary cell radio network temporary identifier (C-RNTI).

13. A base station in a wireless communication system, the base station comprising:
- a transceiver; and
- a controller configured to:
  - receive, from a terminal via the transceiver, a random access preamble in a random access channel (RACH) occasion,
  - transmit, to the terminal via the transceiver, downlink control information (DCI) based on a random access-radio network temporary identifier (RA-RNTI), the RA-RNTI being identified based on an index of an orthogonal frequency division multiplexing (OFDM) symbol associated with the RACH occasion and a frequency index associated with the RACH occasion; and
  - transmit, to the terminal via the transceiver, a random access response (RAR) message based on the DCI,
- wherein the RACH occasion corresponds to a synchronization signal block (SSB) on which a downlink synchronization signal is transmitted.

14. The base station of claim 13, wherein the RACH occasion is identified based on RACH configuration information included in system information.

15. The base station of claim 13, wherein the RAR message is transmitted based on beam information associated with the SSB.

16. The base station of claim 13, wherein the RAR includes an uplink grant, a timing advance command, and a temporary cell radio network temporary identifier (C-RNTI).

* * * * *